United States Patent
Naito et al.

(10) Patent No.: US 8,206,826 B2
(45) Date of Patent: Jun. 26, 2012

(54) METHOD FOR PRODUCING HEAT-EXPANDABLE MICROSPHERES AND APPLICATION THEREOF

(75) Inventors: Hiroki Naito, Yao (JP); Satoshi Kawanami, Yao (JP); Katsushi Miki, Yao (JP); Ikuo Yosejima, Yao (JP); Kenichi Kitano, Yao (JP)

(73) Assignee: Matsumoto Yushi-Seiyaku Co., Ltd., Yao-Shi (JP)

( * ) Notice: Subject to any disclaimer, the term of this patent is extended or adjusted under 35 U.S.C. 154(b) by 0 days.

(21) Appl. No.: 12/594,317

(22) PCT Filed: May 14, 2008

(86) PCT No.: PCT/JP2008/001198
§ 371 (c)(1),
(2), (4) Date: Oct. 1, 2009

(87) PCT Pub. No.: WO2008/142849
PCT Pub. Date: Nov. 27, 2008

(65) Prior Publication Data
US 2010/0120929 A1    May 13, 2010

(30) Foreign Application Priority Data
May 21, 2007 (JP) ................. 2007-134009

(51) Int. Cl.
*C08F 2/44* (2006.01)
(52) U.S. Cl. ............. 428/402; 428/402.21; 428/402.22; 428/402.24; 427/213.3; 427/213.34; 264/4; 264/4.1; 264/4.33; 264/4.7
(58) Field of Classification Search ...... 428/402–402.24; 427/213.3–213.36; 264/4–4.7
See application file for complete search history.

(56) References Cited

U.S. PATENT DOCUMENTS

| | | | |
|---|---|---|---|
| 3,615,972 A | 10/1971 | Morehouse et al. | |
| 5,155,138 A | 10/1992 | Lundqvist | |
| 5,871,710 A * | 2/1999 | Bogdanov et al. | 424/1.65 |
| 6,613,810 B1 | 9/2003 | Ejiri et al. | |
| 2001/0051666 A1 | 12/2001 | Kron et al. | |
| 2007/0154711 A1* | 7/2007 | Masuda et al. | 428/402.22 |

FOREIGN PATENT DOCUMENTS

| | | |
|---|---|---|
| EP | 0 559 254 A1 | 9/1993 |
| EP | 1 947 121 A1 | 7/2008 |
| EP | 1 952 881 A1 | 8/2008 |
| EP | 2 204 428 A1 | 7/2010 |
| JP | S62-286534 A | 12/1987 |
| JP | H04-292643 A | 10/1992 |
| JP | H06-049260 A | 2/1994 |
| JP | H11-209504 A | 8/1999 |
| JP | 2003-531928 A | 10/2003 |
| JP | 2003-327482 A | 11/2003 |
| JP | 2003-327483 A | 11/2003 |
| JP | 2004-131361 A | 4/2004 |
| JP | 2005-067943 A | 3/2005 |
| WO | WO-2007/046273 A1 | 4/2007 |
| WO | WO-2007/058379 A1 | 5/2007 |

OTHER PUBLICATIONS

Supplementary European Search Report of the corresponding European application No. 08 75 1716, dated Jan. 18, 2011.

* cited by examiner

*Primary Examiner* — Irina S Zemel
(74) *Attorney, Agent, or Firm* — Global IP Counselors, LLP

(57) ABSTRACT

A production method for heat-expandable microspheres, which have high expanding ratio and are thermally expanded into hollow particulates having excellent repeated-compression durability, and application thereof are provided. The method produces heat-expandable microspheres a shell of thermoplastic resin and a blowing agent being encapsulated therein and having a boiling point not higher than the softening point of the thermoplastic resin.

22 Claims, 1 Drawing Sheet

METHOD FOR PRODUCING HEAT-EXPANDABLE MICROSPHERES AND APPLICATION THEREOF

CROSS-REFERENCE TO RELATED APPLICATIONS

This U.S. National stage application claims priority under 35 U.S.C. §119(a) to Japanese Patent Application No. 2007-134009, filed in Japan on May 21, 2007, the entire contents of which are hereby incorporated herein by reference.

TECHNICAL FIELD

The present invention relates to a method of producing heat-expandable microspheres, and application thereof.

TECHNICAL BACKGROUND

Heat-expandable microspheres have a structure comprising a shell of thermoplastic resin and a blowing agent encapsulated therein, and are generally called heat-expandable microcapsules. Thermoplastic resins usually include vinylidene chloride copolymers, acrylonitrile copolymers, and acrylic copolymers; and a blowing agent mainly employed includes hydrocarbons, such as isobutane and isopentane. (Please see U.S. Pat. No. 3,615,972)

Heat-expandable microcapsules having high thermal durability, for example, those comprising a shell of thermoplastic resin produced from a component containing 80 weight percent or more of a nitrile monomer, 20 weight percent or less of a non-nitrile monomer, and a cross-linking agent are disclosed in JP A 62-286534. The method produces heat-expandable microcapsules in a process where a polymerizable mixture comprising a blowing agent, a polymerizable monomer, and a polymerization initiator is suspension-polymerized in an aqueous dispersing medium comprising colloidal silica as a dispersion stabilizer (a suspending agent), a diethanolamine-adipic acid condensate as a stabilizing auxiliary, and a polymerization auxiliary.

The polymerization auxiliary is usually used to control the generation of emulsion-polymerization products or prevent the generation of scale in an aqueous medium in the process of suspension-polymerization. Recently, a demand for developing a polymerization auxiliary, which improves the properties of resultant heat-expandable microcapsules and hollow particulates produced by thermally expanding the microcapsules, has been emerged, aside from the purpose for controlling the generation of emulsion-polymerization products and preventing scale in an aqueous medium. JP A 11-209504 discloses a method of producing heat-expandable microcapsules by applying so-called polymerization inhibitors, such as ascorbic acids and alkali metal nitrites, as a polymerization auxiliary instead of potassium dichromate. JP A 11-209504 describes heat-expandable microcapsules produced in the method sharply expand in heating and that are processed into uniformly expanded product (hollow particulates). However, the properties, such as expanding ratio, of the microcapsules are not sufficiently improved. Furthermore ascorbic acids are not preferable because they have poor thermal stability and decompose to lose their function as a polymerization inhibitor during polymerization reaction. In addition, alkali metal nitrites cause a problem, i.e., a cost for wastewater treatment after polymerization, because the Ordinance for Water Pollution Control Act which enforces the Water Pollution Control Act of Japan defines the limit values of alkali metal nitrites contained in ground water. Thus ascorbic acids and alkali metal nitrites are not satisfactory as polymerization auxiliaries at present, because they do not sufficiently improve the properties of resultant heat-expandable microcapsules and hollow particulates obtained by thermally expanding the microcapsules and they cause the problem mentioned above when they are employed in polymerization.

In the conventional research and development for hollow particulates obtained by thermally expanding heat-expandable microcapsules, researchers have concentrated on improving the properties of hollow particulates by studying the variants and ratio of thermoplastic resins and blowing agents constituting the hollow particulates.

Hollow particulates having improved durability against repeated-compression are described, for example, in JP A 2003-327482 and JP A 2003-327483, where thermally expanded microcapsules having polar groups on their surface are disclosed as hollow particulates which are durable against rupture in mixing and molding a ceramic composition. However, the durability of the microcapsules against rupture in mixing and molding has not been sufficiently improved.

JP A 2004-131361 describes hollow particulates for lightweight cement articles. The hollow particulates are produced by thermally expanding heat-expandable microcapsules which comprise a shell of polymer produced from a monomer composition and a cross-linking agent, and have an expanding ratio ranging from 20 times to 100 times. However, the durability of the hollow particulates has not been sufficiently improved.

Further, JP A 2005-067943 discloses a mixture of hollow particulates and heat-expandable microcapsules which are durable against rupture in mixing and molding a ceramic composition. However, the invention has only sharpened the particle size distribution of the mixture, and has not substantially improved the durability.

As mentioned above, hollow particulates having sufficiently improved durability against repeated compression have not been produced, though the durability of hollow particulates against repeated compression has been studied in various ways. The hollow particulates obtained by thermally expanding the heat-expandable microcapsules described in the Patent Reference 3 have also poor durability against repeated compression.

DETAILED DESCRIPTION OF THE INVENTION

Technical Problem

The object of the present invention is to provide a method of producing heat-expandable microspheres, that have a high expanding ratio and are thermally expanded into hollow particulates exhibiting excellent durability against repeated compression and application thereof.

Technical Solution

For solving the problems described above, the inventors of the present invention have studied diligently to find that heat-expandable microspheres, which are thermally expanded into hollow particulates of excellent durability against repeated compression, are produced through dispersion polymerization in an aqueous dispersing medium, in which a polymerizable component and blowing agent are dispersed, in the presence of a specific water-soluble compound, and thus have achieved the present invention.

A method of producing heat-expandable microspheres, each comprising a shell of thermoplastic resin and a blowing agent encapsulated therein having a boiling point not higher than the softening point of the thermoplastic resin. The method comprises the step of polymerizing a polymerizable component in an aqueous dispersing medium in the presence of at least one water-soluble compound, wherein the polymerizable component and the blowing agent mentioned above are dispersed in the aqueous dispersing medium, and the water-soluble compound is selected from the group consisting of oxygen-containing aluminum salts and/or their hydrates, and polyalkyleneimines having a molecular weight not lower than 1000 and at least one bond of a nitrogen atom and an alkyl group which is substituted with a hydrophilic functional group selected from the group consisting of carboxylic acid (salt) groups and phosphonic acid (salt) groups.

The aluminum salts should preferably be a salt containing an atom of a typical element selected from the group consisting of nitrogen and sulfur.

The polyalkyleneimines should preferably be at least one selected from polyethyleneimines, polypropyleneimines, and polybutyleneimines; and the substituted alkyl group should preferably be at least one selected from the methyl group, ethyl group, and propyl group substituted with the hydrophilic functional group. The ratio of the nitrogen atom constituting the bond should preferably be at least 10% of the whole of nitrogen atoms in the polyalkyleneimines.

It is preferable that the water-soluble compound further contains at least one compound selected from the group consisting of metal halides and/or their hydrates, water-soluble polyphenols, water-soluble vitamin Bs, and water-soluble 1,1-substituted compounds having a bond at which a carbon atom is bonded with a hetero atom and a hydrophilic functional group selected from the group consisting of hydroxyl group, carboxylic acid (salt) groups, and phosphonic acid (salt) groups.

The ratio of the water-soluble compound should preferably range from 0.0001 to 1.0 part by weight to 100 parts by weight of the polymerizable component.

The polymerizable component should preferably contain at least one monomer selected from the group consisting of nitrile monomers, (meth)acrylate ester monomers, carboxyl-group-containing monomers, styrene monomers, vynil acetate, acrylamide monomers, maleimide monomers, and vinylidene chloride.

The polymerization should preferably be carried out in the presence of peroxydicarbonate as a polymerization initiator.

The method should preferably contain a step of adhering a particulate filler on the outer surface of the shell.

The heat-expandable microspheres of the present invention are produced in the method mentioned above, and have a maximum expanding ratio not lower than 50 times. The hollow particulates produced by thermally expanding the microspheres have a repeated-compression durability not lower than 75 percent.

The hollow particulates of the present invention are produced by thermally expanding the heat-expandable microspheres.

The composition of the present invention comprises a base component and the heat-expandable microspheres and/or the hollow particulates mentioned above.

The formed products of the present invention are manufactured by forming the composition.

Advantageous Effects

The method of producing the heat-expandable microspheres of the present invention efficiently produces heat-expandable microspheres, which have high expanding ratio, and are thermally expanded into hollow particulates having excellent durability against repeated compression.

The heat-expandable microspheres of the present invention have high expanding ratio, and are thermally expanded into hollow particulates having excellent durability against repeated compression.

The hollow particulates of the present invention have excellent durability against repeated compression, because they are produced from the heat-expandable microspheres.

The composition and the formed products of the present invention comprise the hollow particulates and have excellent durability against repeated compression.

EXPLANATION OF REFERENCES

Figure 1:
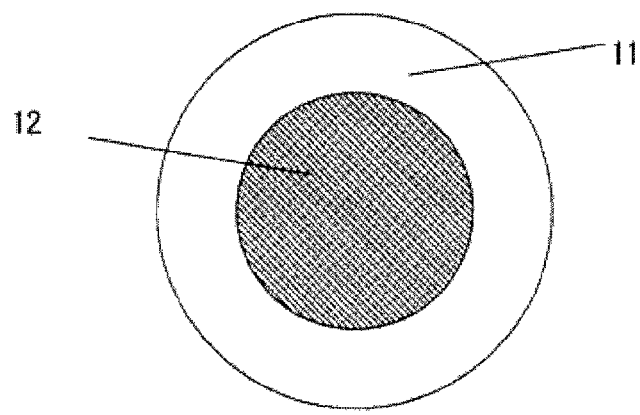
FIG. 1 Diagram illustrating an example of the heat-expandable microspheres of the present invention FIG. 2 Diagram illustrating the expanding device of a machine employed for manufacturing hollow particulates, whose durability against repeated compression is to be measured

1: Hot gas nozzle
2: Cooling medium flow
3: Overheating preventive tube
4: Dispersion nozzle
5: Collision plate
6: Gas fluid containing heat-expandable microspheres
7: Gas flow
8: Hot gas flow
11: Shell of thermoplastic resin
12: Blowing agent

BEST MODE FOR CARRYING OUT THE INVENTION

[Production Method of Heat-Expandable Microspheres]

The method of producing heat-expandable microspheres of the present invention produces heat-expandable microspheres which comprise a shell of thermoplastic resin and a blowing agent encapsulated therein having a boiling point not higher than the softening point of the thermoplastic resin. The method of the present invention comprises the step of polymerizing a polymerizable component in an aqueous dispersing medium, in which the polymerizable component and the blowing agent are dispersed, in the presence of a specific water-soluble compound.

The blowing agent is not specifically restricted so far as it is a substance having a boiling point not higher than the softening point of the thermoplastic resin, and includes, for example, $C_1$-$C_{12}$ hydrocarbons and their halides, $C_2$-$C_{10}$ fluorides having an ether structure and containing no chlorine and bromine atoms, tetraalkyl silane, and compounds which thermally decompose to generate gas. One of or a combination of at least two of those blowing agents may be used.

The examples of the $C_1$-$C_{12}$ hydrocarbons are propane, cyclopropane, propylene, butane, normal butane, isobutane, cyclobutane, normal pentane, cyclopentane, isopentane, neopentane, normal hexane, isohexane, cyclohexane, heptane, cycloheptane, octane, isooctane, cyclooctane, 2-methylpentane, 2,2-dimethylbutane, and petroleum ether. These hydrocarbons may have any of a linear, branched or alicyclic structure, and aliphatic hydrocarbons are preferable.

The halides of $C_1$-$C_{12}$ hydrocarbons include methyl chloride, methylene chloride, chloroform, and carbon tetrachloride.

The $C_2$-$C_{10}$ fluorides having an ether structure and containing no chlorine and bromine atoms include, for example, hydrofluoroethers, such as $C_3H_2F_7OCF_2H$, $C_3HF_6OCH_3$, $C_2H_4OC_2H_2F_3$, $C_2H_2F_3OC_2H_2F_3$, $C_4HF_8OCH_3$, $C_3H_2F_5OC_2H_3F_2$, $C_3HF_6OC_2H_2F_3$, $C_3H_3F_4OCHF_2$, $C_3HF_6OC_3H_2F_5$, $C_4H_3F_6OCHF_2$, $C_3H_3F_4OC_2HF_4$, $C_3HF_6OC_3H_3F_4$, $C_3F_7OCH_3$, $C_4F_9OCH_3$, $C_4F_9OC_2H_5$, and $C_7F_{15}OC_2H_5$. One of or a combination of at least two of those fluorides may be used. The (fluoro)alkyl groups of those hydrofluoroethers may be either linear or branched groups.

The tetraalkylsilane includes, for example, silanes having $C_1$-$C_5$ alkyl groups, such as tetramethylsilane, trimethylethylsilane, trimethylisopropylsilane, and trimethyl-n-propylsilane.

The compounds which thermally decompose to generate gas include, for example, azodicarbonamide, N,N'-dinitrosopentamethylene tetramine, and 4,4'-oxybis(benzenesulfonyl hydrazide).

The polymerizable component is polymerized in the presence of a polymerization initiator to be converted into thermoplastic resin which constitutes the shell of heat-expandable microspheres. The polymerizable component essentially comprises a monomer component and optionally contains a cross-linking agent.

The monomer component includes those usually called (radically) polymerizable monomers having one polymerizable double bond, and includes, but not specifically restricted to, for example, nitrile monomers, such as acrylonitrile, methacrylonitrile, alpha-chloroacrylonitrile, alpha-ethoxyacrylonitrile, and fumaronitrile; carboxyl-group-containing monomers, such as acrylic acid, methacrylic acid, itaconic acid, maleic acid, fumaric acid, and citraconic acid; halogenated vinyl monomers, such as vinylidene chloride, vinyl chloride, vinyl bromide, and vinyl fluoride; vinylester monomers, such as vinyl acetate, vinyl propionate, and vinyl butyrate; (meth)acrylate monomers, such as methyl (meth) acrylate, ethyl (meth)acrylate, n-butyl (meth)acrylate, isobutyl (meth)acrylate, t-butyl (meth)acrylate, propyl (meth)acrylate, n-octyl (meth)acrylate, dodecyl (meth)acrylate, 2-ethylhexyl (meth)acrylate, stearyl (meth)acrylate, 2-chloroethyl (meth)acrylate, phenyl (meth)acrylate, isobornyl (meth)acrylate, cyclohexyl (meth)acrylate, benzyl (meth) acrylate, beta-carboxyethyl acrylate, 2-hydroxyethyl (meth) acrylate, and 2-hydroxypropyl (meth)acrylate; acrylamide monomers, such as acrylamide, substituted acrylamide, methacrylamide, and substituted methacrylamide; maleimide monomers, such as N-phenyl maleimide, N-(2-chlorophenyl) maleimide, N-cyclohexyl maleimide, and N-lauryl maleimide; styrene monomers, such as styrene, alpha methyl styrene, o-methyl styrene, m-methyl styrene, p-methyl styrene, p-ethyl styrene, 2,4-dimethyl styrene, p-n-butyl styrene, p-tert-butyl styrene, p-n-hexyl styrene, p-n-octyl styrene, p-n-nonyl styrene, p-n-decyl styrene, p-n-dodecyl styrene, n-methoxystyrene, p-phenyl styrene, chlorostyrene, and 3,4-dichlorostyrene; ethylenically unsaturated monoolefin monomers, such as ethylene, propylene, butylene, and isobutylene; vinyl ether monomers, such as vinyl methyl ether, vinyl ethyl ether, and vinyl isobutyl ether; vinyl ketone monomers, such as vinyl methyl ketone, vinyl hexyl ketone, and methyl isopropenyl ketone; N-vinyl monomers, such as N-vinyl pyrrole, N-vinyl carbazole, N-vinyl indole, and N-vinyl pyrrolidone; and vinylnaphthalene salts. Part of or all of the carboxyl groups in the carboxyl-group-containing monomers, may be neutralized in the polymerization. The term, (meth)acryl, means acryl or methacryl. The maleimide monomers should preferably be N-substituted maleimide monomers having a substituent group bonded to a nitrogen atom.

One of or a combination of at least two of those radically polymerizable monomers may be used as a component constituting the polymerizable component. The polymerizable component should preferably contain at least one radically polymerizable monomer selected from the group consisting of nitrile monomers, (meth)acrylate monomers, carboxyl-group-containing monomers, styrene monomers, vinyl acetate, acrylamide monomers, maleimide monomers, and vinylidene chloride monomers.

A polymerizable component essentially comprising nitrile monomers is preferable because such a component attains improved heat resistance and solvent resistance of thermoplastic resin constituting the shell of heat-expandable microspheres.

A polymerizable component comprising a halogenated vinyl monomer and/or a (meth)acrylate monomer in addition to a nitrile monomer is further preferable. A polymerizable component containing a halogenated vinyl monomer, such as vinylidene chloride, improves gas-barrier property of resultant heat-expandable microspheres. A polymerizable component containing a (meth)acrylate monomer contributes to easily controllable expanding behavior of resultant heat-expandable microspheres.

The polymerizable component, which further comprises a carboxyl-group-containing monomer, in addition to a nitrile monomer, is preferable, because such component improves the heat resistance and solvent resistance of resultant thermoplastic resin, increases the glass-transition temperature of the thermoplastic resin, and makes resultant heat-expandable microspheres expand at high temperature. The polymerizable component may further contain a halogenated vinyl monomer and/or (meth)acrylate monomer in addition to the nitrile monomer and carboxyl-group-containing monomer.

In the above description, a polymerizable component further containing a maleimide monomer is preferable, because such component minimizes the coloring of resultant heat-expandable microspheres.

The monomer component which comprises a monomer having halogen, oxygen, or nitrogen effectively prevents the coagulation of heat-expandable microspheres generated in polymerization and the generation of scale in a polymerization reactor.

The polymerizable component may contain a polymerizable monomer having at least two polymerizable double bonds (a cross-linking agent), in addition to the monomer components mentioned above. Polymerization with a cross-linking agent restrains the loss of the retention (internal retention) of a blowing agent encapsulated in thermally expanded microspheres so as to optimize the efficiency of thermal expansion of the microspheres.

The cross-linking agent is not specifically restricted, and includes, for example, aromatic divinyl compounds, such as divinyl benzene and divinyl naphthalene; and di(meth)acrylate compounds, such as allyl methacrylate, triacrylformal, triallyl isocyanate, ethylene glycol di(meth)acrylate, diethylene glycol di(meth)acrylate, triethylene glycol di(meth)acrylate, 1,4-butanediol di(meth)acrylate, 1,9-nonanediol di(meth)acrylate, 1,10-decanediol di(meth)acrylate, PEG (200) di(meth)acrylate, PEG (400) di(meth)acrylate, PEG (600) di(meth)acrylate, neopentylglycol di(meth)acrylate, 1,4-butanediol dimethacrylate, 1,6-hexanediol di(meth)acrylate, 1,9-nonanediol di(meth)acrylate, trimethylolpropane trimethacrylate, glycerin dimethacrylate, dimethylol tricyclodecane diacrylate, pentaerythritol tri(meth)acrylate, pentaerythritol tetraacrylate, dipentaerythritol hexaacrylate, neopentylglycol acrylic acid benzoate, trimethylolpropane acrylic acid benzoate, 2-hydroxy-3-acryloyloxypropyl methacrylate, hydroxypivalic acid neopentylglycol diacrylate, ditrimethylolpropane tetraacrylate, and 2-butyl-2-ethyl-1,3-propanediol diacrylate. One of or a combination of at least two of those cross-linking agents may be used. In the above description, the series of the compounds described as "PEG (***) di(meth)acrylate" are polyethylene glycol di(meth)acrylates, wherein the average molecular weight of their polyethylene glycol moieties is represented by the number in the parentheses.

The amount of the cross-linking agent is not specifically restricted, and should preferably be in the ranges described below from 1) to 7) in the order (a latter range is more preferable than a former) to 100 parts by weight of a monomer component, considering the degree of cross-linking, the internal retention of a blowing agent encapsulated in a shell, and heat resistance and thermal expanding performance of resultant microspheres.

The ranges are 1) 0.01 to 5 parts by weight, 2) 0.03 to 3 parts by weight, 3) 0.05 to 3 parts by weight, 4) 0.05 to 2.5 parts by weight, 5) 0.1 to 2.5 parts by weight, 6) 0.1 to 2 parts by weight, and 7) 0.1 to 1 part by weight.

In the production method of the present invention, it is preferable to polymerize the polymerizable component in the presence of the polymerization initiator.

The polymerization initiator is not specifically restricted, and includes, for example, peroxides, such as peroxydicarbonate, peroxy ester, and diacyl peroxide; and azo compounds. One of or a combination of at least two of the polymerization initiator may be employed. A preferable polymerization initiator is an oil-soluble polymerization initiator which is soluble in a radically polymerizable monomer.

Among those polymerization initiators, peroxydicarbonates are preferable, because they control the generation of resin particles inside the shell of heat-expandable microspheres, make the shell less apt to become thinner than its theoretical value, and increase the expanding ratio of resultant heat-expandable microspheres. A more preferable peroxydicarbonate is at least one selected from the group consisting of diisopropyl peroxydicarbonate, bis(4-t-butylcyclohexyl) peroxydicarbonate, di-sec-butyl peroxydicarbonate, and di(2-ethylhexyl) peroxydicarbonate, and a more preferable peroxydicarbonate is at least one selected from the group consisting of di-sec-butyl peroxydicarbonate and di(2-ethylhexyl) peroxydicarbonate, considering the availability of peroxydicarbonates and their effect, such as the (co)polymerizability of a polymerizable component and the randomization of the structure of a thermoplastic resin constituting the shell of microspheres.

The amount of the polymerization initiators is not specifically restricted, and should preferably range from 0.3 to 8 parts by weight to 100 parts by weight of the monomer component, more preferably from 0.4 to 7.5 parts by weight, further preferably from 0.5 to 7.5 parts by weight, further more preferably from 0.5 to 7 parts by weight, and most preferably from 0.8 to 7 parts by weight.

For a polymerization initiator containing another polymerization initiator in addition to a peroxydicarbonate, higher ratio of the peroxydicarbonate in the polymerization initiator results in higher effect in polymerization. The ratio of the peroxydicarbonate in a polymerization initiator should preferably be not lower than 60 weight percent, more preferably not lower than 70 weight percent, further preferably not lower than 80 weight percent, further more preferably not lower than 90 weight percent, and most preferably 100 weight percent.

In the production method of the present invention, a chain transfer agent, organic pigment, and inorganic pigment and particles having hydrophobized surface may be further employed.

In the present invention, the aqueous dispersing medium mainly comprises water (preferably deionized water) for dispersing an oily mixture comprising a polymerizable component and a blowing agent, and may further contain a hydrophilic organic solvent, such as alcohols. The amount of the aqueous dispersing medium is not specifically restricted, and should preferably range from 100 to 1000 parts by weight to 100 parts by weight of a polymerizable component.

The aqueous dispersing medium may further contain an electrolyte. The electrolyte is not specifically restricted, and includes, for example, lithium chloride, sodium chloride, potassium chloride, magnesium chloride, calcium chloride, sodium carbohydrate, lithium sulfate, sodium sulfate, potassium sulfate, magnesium sulfate, ammonium sulfate, sodium carbonate, and benzoic acid. One of or a combination of at least two of those electrolytes may be used. The amount of the electrolyte in an aqueous dispersing medium is not specifically restricted, and should preferably range from 0.1 to 50 parts by weight to 100 parts by weight of an aqueous dispersing medium.

In the production method of the present invention, the water-soluble compound should preferably be dissolved in the aqueous dispersing medium, and a part of the water-soluble compound may be present in an oily mixture of the polymerizable component and blowing agent. The polymerization of the polymerizable component in the presence of the water-soluble compound efficiently produces heat-expandable microspheres, which have high expanding ratio and are thermally expanded into hollow microparticles having excellent durability against repeated compression.

The water-soluble compound is used as a polymerization auxiliary in the production process of heat-expandable microspheres. The term, "water-soluble", in the present invention means that at least 1 g of a compound is soluble in 100 g of water.

The water-soluble compound is at least one selected from the group consisting of aluminum salts and/or their hydrates (hereinafter the "aluminum salts and/or their hydrates" may sometimes be referred to as "aluminum salts (hydrates)", for abbreviation), and polyalkyleneimines.

The aluminum salts contain aluminum and oxygen atoms, and preferably further contain an atom of a typical element selected from the group consisting of nitrogen and sulfur.

The aluminum salt comprises a cation essentially having an aluminum ion, and an anion essentially having an oxygen atom.

The cation constituting the aluminum salt may contain a cation other than the aluminum ion. Such cations are, for example, alkali metal ions (Group I metal ions) including lithium ion, sodium ion, and potassium ion; alkali earth metal ions (Group II metal ions) including beryllium ion, magnesium ion, calcium ion, strontium ion, and barium ion; and ammonium ion ($NH_4^+$). At least one of those cations should be contained in the aluminium-ion-containing cation which constitutes the aluminum salt, and potassium ion, sodium ion, and ammonium ion are preferable among those cations.

The anion constituting the aluminum salt is not specifically restricted so far as the anion essentially contains an oxygen atom. Such anions are, for example, nitrogen-containing ions such as nitrate ion ($NO_3-$) and nitrite ion ($NO_2-$); sulfur-containing ions such as hydrogen sulfate ion ($HSO_4-$), sulfate ion ($SO_4^{2-}$), sulfite ion ($SO_3^{2-}$), and thiosulfate ion ($S_2O_3^{2-}$); chloride-containing ions such as hypochlorite ion ($ClO-$), chlorite ion ($ClO_2-$), chlorate ion ($ClO_3-$), and perchlorate ion ($ClO_4-$); and fatty acid ions such as formate ion ($HCOO-$), acetate ion ($CH_3COO-$), and oxalate ion ($C_2O_4^{2-}$). At least one of those anions constitutes the aluminum salt. Among those anions, nitrate ion and sulfate ion are preferable, and sulfate ion is more preferable.

The aluminum salt includes, for example, aluminum sulfates including alums ($AlK(SO_4)_2$, $AlNa(SO_4)_2$, and $Al(NH_4)(SO_4)_2$) and aluminum sulfate; aluminum hydrosulfate ($Al(HSO_4)_3$); aluminum sulfite ($Al_2(SO_3)_3$); aluminum thiosulfate ($Al_2(S_2O_3)_2$); aluminum nitrate ($Al(NO_3)_3$); aluminum nitrite ($Al(NO_2)_3$); aluminum hypochlorite ($Al(ClO)_3$); aluminum chlorite ($Al(ClO_2)_3$); aluminum chlorate ($Al(ClO_3)_3$); aluminum perchlorate ($Al(ClO_4)_3$); and fatty acid aluminum salt such as aluminum formate (($HCOO)_3Al$), aluminum acetate (($CH_3COO)_3Al$), aluminum propionate (($CH_3CH_2COO)_3Al$), aluminum butyrate (($CH_3(CH_2)_2COO)_3Al$), aluminum valerate (($CH_3(CH_2)_3COO)_3Al$), aluminum caproate (($CH_3(CH_2)_4COO)_3Al$), aluminum enanthate (($CH_3(CH_2)_5COO)_3Al$), aluminum caprylate (($CH_3(CH_2)_6COO)_3Al$), aluminum pelargonate (($CH_3(CH_2)_7COO)_3Al$), aluminum caprate (($CH_3(CH_2)_8COO)_3Al$), aluminum laurate (($CH_3(CH_2)_{10}COO)_3Al$), aluminum myristate (($CH_3(CH_2)_{12}COO)_3Al$), aluminum palmitate (($CH_3(CH_2)_{14}COO)_3Al$), aluminum stearate (($CH_3(CH_2)_{16}COO)_3Al$), aluminum oxalate (($C_2O_4)_3Al_2$), aluminum acrylate (($CH_2=CHCOO)_3Al$), aluminum methacrylate (($CH_2=CCH_3COO)_3Al$), aluminum lactate (($CH_3CH(OH)COO)_3Al$), aluminum benzoate (($C_6H_5COO)_3Al$), and aluminum salicylate (($C_6H_4(OH)COO)_3Al$). The fatty acid aluminum salts may either be linear or branched. One of or a combination of at least two of the aluminum salts may be employed. Among the aluminum salts, aluminum sulfates are preferable because they are used for medicines and are easily processed in waste water treatment.

The polyalkyleneimines have at least one bond of nitrogen and an alkyl group substituted with a hydrophilic functional group selected from the group consisting of carboxylic acid (salt) groups and phosphonic acid (salt) groups (the alkyl group hereinafter sometimes referred to as "substituted alkyl group (A)" for abbreviation).

The polyalkyleneimines are also described as a compound having a backbone of N-unsubstituted polyalkyleneimine obtained by polymerizing at least one type of alkyleneimine, wherein at least one amino group selected form the secondary amino group (—NH—) and primary amino group (—NH_2) contained in the backbone is modified into a tertiary amino group (—NR— or —NR_2) and/or secondary amino group (—NHR). The "R" described here represents a substituted alkyl group (A).

The polyalkyleneimines may be either a linear polymer (where all of alkyleneimine units are secondary amino groups) or a branched polymer (where alkyleneimine units contain primary and/or tertiary amino groups in addition to secondary amino groups). The polyalkyleneimines may have a backbone comprising copolymers of a plurality of alkyleneimines.

The polyalkyleneimines should have a molecular weight (weight average molecular weight) of at least 1,000, preferably from 1,000 to 1,000,000, more preferably from 5,000 to 500,000, further more preferably from 8,000 to 200,000, and most preferably from 10,000 to 100,000.

Carboxylic acid (salt) groups mean carboxylic acid group or carboxylate groups. Carboxylic acid group is a carboxyl group (—COOH), and carboxylate groups are formed by substituting the proton of a carboxyl group with a metal atom, primary amine group, secondary amine group, tertiary amine group, quaternary amine group, or ammonium group (—$NH_4^+$).

Phosphonic acid (salt) groups mean phosphonic acid group or phosphonate groups. Phosphonic acid group is —$PO_3H_2$, and phosphonate groups are formed by substituting at least one proton of a phosphonic acid group with a metal atom, primary amine group, secondary amine group, tertiary amine group, quaternary amine group, or ammonium group (—$NH_4^+$).

The metal atom includes, for example, alkali metals, such as lithium, sodium, and potassium (Group I metals in periodic table); alkaline earth metals, such as beryllium, magnesium, calcium, strontium, and barium (Group II metals in periodic table); and transition metals, such as iron, copper, manganese, zinc, and cobalt. Among those metal atoms, sodium and potassium are preferable.

The primary amine group is obtained by reacting a primary amine with a proton, and has a charge of +1; the secondary amine group is obtained by reacting a secondary amine with a proton, and has a charge of +1; the tertiary amine group is obtained by reacting a tertiary amine with a proton, and has a charge of +1; and the quaternary amine group is obtained by substituting a proton of a tertiary amine group with a hydrocarbon group, and has a charge of +1.

The primary, secondary, and tertiary amines used as the raw materials for the primary, secondary, and tertiary amine groups are $C_1$-$C_5$ (mono, di, or tri) alkylamine, such as ethylamine and propylamine; $C_2$-$C_{10}$ (mono, di, or tri) alkanolamine, such as monoethanolamine, diethanolamine, triethanolamine, monoisopropanolamine, diisopropanolamine, triisopropanolamine, and cyclohexyldiethanolamine; morpholine; $C_5$-$C_{20}$ cycloalkylamine, such as dicyclohexylamine; and 3,3-dimethylpropanediamine.

The quaternary amine group includes, for example, dodecyltrimethyl ammonium, coco-alkyltrimethyl ammonium, hexadecyltrimethyl ammonium, tallow-alkyltrimethyl ammonium, octadecyltrimethyl ammonium, behenyltrimethyl ammonium, coco-alkyldimethylbenzyl ammonium, tetradecyldimethylbenzyl ammonium, octadecyldimethylbenzyl ammonium, coco-alkyl ammonium, tetradecyl ammonium, octadecyl ammonium, triethylmethyl ammonium, dioleyldimethyl ammonium, and didecyldimethyl ammonium.

The alkylene group contained in the polyalkyleneimines is not specifically restricted so far as it is a divalent saturated hydrocarbon group, and includes $C_1$-$C_{10}$ saturated divalent hydrocarbon (—$C_nH_{2n}$—, where n is an integer ranging from 1 to 10), preferably ethylene, propylene and butylene. The divalent saturated hydrocarbon group may be substituted with a hydroxyl group, alkoxy group (for example, methoxy group, ethoxy group, etc.), and halogen atom (for example, fluorine atom, chlorine atom, bromine atom, etc.).

Preferable substituted alkyl group (A) includes substituted methyl group, substituted ethyl group, and substituted propyl group.

The preferable substituted alkyl group (A) is represented by the chemical formula (I) shown below.

[Formula 1]

$$-C_pH_{2p}-X \quad (1)$$

(where p is an integer ranging from 1 to 10, $C_pH_{2p}$ may either be linear or branched chain, and X is a carboxylic acid (salt) group or phosphonic acid (salt) group.)

The formula having p=1 represents substituted methyl group, that having p=2 represents substituted ethyl group, and that having p=3 represents substituted propyl group.

The ratio of nitrogen atoms bonding to the substituted alkyl groups (A) in the polyalkyleneimine (hereinafter sometimes referred to as "substitution ratio of substituted alkyl group (A)" for abbreviation) should preferably be at least 10% of the nitrogen atoms contained in the polyalkyleneimine, more preferably at least 20%, further preferably at least 30%, further more preferably at least 50%, and most preferably at least 70%. A substitution ratio of substituted alkyl group (A) which is less than 10% may fail to attain the effect of the present invention.

The polyalkyleneimine includes, for example, a polyethyleneimine having at least one bond of a nitrogen atom and substituted methyl group, a polypropyleneimine having at least one bond of a nitrogen atom and substituted methyl group, a polybutyleneimine having at least one bond of a nitrogen atom and substituted methyl group, a polyethyleneimine having at least one bond of a nitrogen atom and substituted ethyl group, a polypropyleneimine having at least one bond of a nitrogen atom and substituted ethyl group, a polybutyleneimine having at least one bond of a nitrogen atom and substituted ethyl group, a polyethyleneimine having at least one bond of a nitrogen atom and substituted propyl group, a polypropyleneimine having at least one bond of a nitrogen atom and substituted propyl group, and a polybutyleneimine having at least one bond of a nitrogen atom and substituted propyl group. One of or a combination of at least two of the polyalkyleneimines may be used.

The water-soluble compound may further contain a water-soluble compound other than an aluminium salt (hydrate) and/or a polyalkyleneimine. Such water-soluble compound includes the water-soluble compounds (1) to (4) described below, and one of or a combination of at least two of the compounds may be used.

The water-soluble compound further containing at least one of the water-soluble compounds (1) to (4) may exhibit more advantageous effect in attaining the maximum expanding ratio of microspheres and their durability against repeated compression, in preventing coagulation of heat-expandable microspheres produced in polymerization, and in preventing scale generation in a polymerization reactor.

Water-soluble compound (1): metal halide and/or its hydrate (hereinafter may sometimes be referred to as "metal halide (hydrate)" for abbreviation)

The metal halide is a water-soluble halide of a metal.

Metals constituting the metal halide are, for example, Group III metals, such as scandium and cerium; Group IV metals, such as titanium, zirconium, and hafnium; Group V metals, such as vanadium and tantalum; Group VI metals, such as chromium, molybdenum, and tungsten; Group VII metals, such as manganese and rhenium; Group VIII metals such as iron, ruthenium, and osmium; Group IX metals, such as cobalt and rhodium; Group X metals, such as nickel; Group XI metals such as silver and gold; Group XII metals, such as zinc and cadmium; Group XIII metals, such as boron, aluminium, gallium, indium, and thallium; Group XIV metals, such as tin and lead; and Group XV metals, such as arsenic, antimony, and bismuth. Preferable metals among those are titanium, iron, aluminium, antimony, and bismuth; more preferable are aluminium, iron, and antimony; and further more preferable are antimony and aluminium. The classification of the metals described above is based on the "Periodic Table of Elements (2005)©, Atomic Weight Sub-Committee of The Chemical Society of Japan", which was bound at the end of "Kagaku-to Kyoiku (Chemistry and Education) vol. 54, No. 4, 2006".

The valence of the above-mentioned metals is not specifically restricted, and trivalent metals among the metals of various valences are preferable because they sufficiently attains the effect of the present invention, and their activity is not excessively high nor low, in other words, they exhibit proper activity.

The metal halide is not specifically restricted, and may include an organic group in its molecule. Halogens forming the metal halide are not specifically restricted, and include at least one selected from the group consisting of fluorine, chlorine, bromine, iodine, and astatine; preferably one selected from the group consisting of fluorine, chlorine, and bromine; more preferably chlorine and/or bromine; and further more preferably chlorine.

Preferable metal halides are the halides of trivalent metals (metal (III) halides). The examples of the metal (III) halides are metal chlorides, such as aluminium (III) chloride, antimony (III) chloride, gallium (III) chloride, gold (III) chloride, cerium (III) chloride, thallium (III) chloride, tungsten (III) chloride, tantalum (III) chloride, titanium (III) chloride, iron (III) chloride, nickel (III) chloride, vanadium (III) chloride, bismuth (III) chloride, arsenic (III) trichloride, ruthenium (III) chloride, rhenium (III) chloride, and osmium (III) chloride; metal fluorides, such as aluminium (III) fluoride and manganese (III) fluoride; and metal bromides, such as aluminium (III) bromide and thallium (III) bromide. One of or a combination of at least two of these metal halides may be used.

Some of metal halides, such as anhydrous aluminum chloride, easily react with water to generate hydrogen chloride, and may form a water-insoluble hydroxide according to the conditions, such as pH, of aqueous medium. Then the concentration of a metal dissolved in water, in this case, aluminum (III), becomes unknown, and the generated hydrogen chloride corrodes a reactor made of metals. For such reasons, a hydrate of a metal halide is preferable.

A hydrate of a metal halide has a water-coordinated complex structure in which the metal atom of the metal halide exists at the center of coordinated water molecules. One of or a combination of at least two of the hydrates of metal halides may be used.

The examples of the hydrates of metal halides are aluminum (III) chloride hexahydrate, chromium (III) chloride n-hydrate, cerium (III) chloride n-hydrate, thallium (III) chloride tetrahydrate, titanium (III) chloride n-hydrate, and aluminum (III) fluoride n-hydrate. The letter, "n", means a hydration number, which is the number of water molecules coordinated to a metal element.

Water-Soluble Compound (2): Water-Soluble Polyphenols

The water-soluble polyphenols are not specifically restricted, and include, for example, flavonoid, catechin, tannin, isoflavone, anthocyanin, rutin, chlorogenic acid, gallic acid, lycopene, quercetin, miricetin, taxifolin, their derivatives and polymers; and those containing the polyphenols, such as green tea extract, red wine extract, cacao extract, and sunflower seed extract. The tannin may be any of hydrolyzable tannins including gallotannin, diphenylmethylolide tannin, and condensed phlobaphene-generating tannin. Tannic acid is a mixture of hydrolyzable tannins. One of or a combination of at least two of these water-soluble polyphenols may be used.

Water-Soluble Compound (3): Water-Soluble Vitamin Bs

The water-soluble vitamin Bs are not specifically restricted, and include, for example, vitamin $B_1$ (thiamine), vitamin B$_2$ (riboflavin), vitamin B$_6$ (pyridoxine), vitamin B$_{12}$ (cobalamine), derivatives of those vitamin Bs being converted into nucleotide or nucleoside; and inorganic acid salts, such as nitrates and chlorides, of those vitamin Bs. One of or a combination of at least two of these water-soluble vitamin Bs may be used.

Water-soluble compound (4): water-soluble 1,1-substituted compounds having a structure in which a carbon atom is bonded with a hetero atom and a hydrophilic functional group selected from the group consisting of hydroxyl group, carboxylic acid (salt) groups, and phosphonic acid (salt) groups.

The water-soluble 1,1-substituted compounds are not specifically restricted, and include, for example, an aminopolycarboxylic acid (salt) formed of a carboxylic acid (salt) group as a hydrophilic functional group and a nitrogen atom as a hetero atom; and aminopolyphosphonic acid (salt) formed of a phosphonic acid (salt) group as a hydrophilic functional group and a nitrogen atom as a hetero atom. The carboxylic acid (salt) group and phosphonic acid (salt) group are those mentioned above.

The aminopolycarboxylic acid (salt) is not specifically restricted, and includes, for example, aminopolycarboxylic acids such as ethylenediaminetetraacetic acid (including its salt), hydroxyethylethylenediaminetriacetic acid (including its salt), diethylenetriaminepentaacetic acid (including its salt), dihydroxyethylethylenediaminediacetic acid (including its salt), 1,3-propanediaminetetraacetic acid (including its salt), diethylenetriaminepentaacetic acid (including its salt), triethylenetetraaminehexaacetic acid (including its salt), nitrilotriacetic acid (including its salt), gluconic acid (including its salt), hydroxyethyliminodiacetic acid (including its salt), L-aspartate-N,N-diacetic acid (including its salt), dicarboxymethyl glutamic acid (including its salt), 1,3-diamino-2-hydroxypropanetetraacetic acid (including its salt), and dihydroxyethyl glycine (including its salt); their metal salts; and their ammonium salts. One of or a combination of at least two of these aminopolycarboxylic acids (salts) may be used.

The aminopolyphosphonic acid (salt) is not specifically restricted, and includes, for example, aminopolyphosphonic acids, such as aminotrimethylenephosphonic acid (and its salt), hydroxyethanephosphonic acid (and its salt), hydroxyethylidenediphosphonic acid (and its salt), dihydroxyethyl glycine (and its salt), phosphonobutanetriacetic acid (and its salt), methylenephosphonic acid (and its salt), nitrilotris (methylenephosphonic acid) (and its salt), and ethylenediaminetetrakis (methylenephosphonic acid) (and its salt); their metal salts; and their ammonium salts. One of or a combination of at least two of these aminopolyphosphonic acids (salts) may be used.

The aminopolycarboxylic acid salt and aminopolyphosphonic acid salt mentioned above mean the metal salts, amine salts, and ammonium salts of aminopolycarboxylic acids and aminopolyphosphonic acids.

The metal salts mentioned above are the compounds in which at least one proton of their acid groups, such as carboxylic acid group and phosphonic acid group, is substituted with a metal atom. The metal atom includes those mentioned in the description about the polyalkyleneimines.

The amine salts mentioned above are the compounds in which at least one proton of their acid groups, such as carboxylic acid group and phosphonic acid group, reacts with an amine. The amine salts are also explained as the compounds in which at least one proton of their acid groups, such as carboxylic acid group and phosphonic acid group, is substituted with a primary, secondary, tertiary or quaternary amine group. The primary, secondary, tertiary, and quaternary amine groups include those mentioned in the description about the polyalkyleneimines.

Other water-soluble 1,1-substituted compounds are not specifically restricted, and include, for example, a compound containing a carboxylic acid (salt) group as the hydrophilic functional group and a nitrogen atom as the hetero atom, such as 2-carboxypyridine, orotic acid, quinolinic acid, lutidinic acid, isocinchomeronic acid, dipicolinic acid, berberonic acid, fusaric acid, and orotic acid; a compound containing a hydroxyl (salt) group as the hydrophilic functional group and a nitrogen atom as the hetero atom, such as 2-hydroxypyridine, 6-hydroxynicotine acid, and citrazinic acid; and a compound containing a carboxylic acid (salt) group as the hydrophilic functional group and a sulfur atom as the hetero atom, such as thiodiglycolic acid.

Preferable water-soluble 1,1-substituted compounds are those containing a carboxylic acid (salt) group and/or phosphonic acid (salt) group as a hydrophilic functional group, and a nitrogen atom and/or sulfur atom as a heteroatom.

The amount of the water-soluble compounds in the aqueous dispersing medium is not specifically restricted, and should range, preferably from 0.0001 to 1.0 part by weight, more preferably from 0.0003 to 0.2 parts by weight, further preferably from 0.0008 to 0.1 (excluding 0.1) parts by weight, and most preferably from 0.001 to 0.07 parts by weight, to 100 parts by weight of a polymerizable component. Insufficient amount of the water-soluble compounds may result in insufficient effect by the water-soluble compounds. Excessive amount of the water-soluble compounds may decrease polymerization rate or increase the amount of raw material, i.e., the polymerizable component, remaining after polymerization.

If the polymerizable component contains a carboxyl-group-containing monomer and the water-soluble compound mentioned above contains a metal, the amount of such water-soluble compound should range, preferably from 0.0001 to 0.1 (excluding 0.1) part by weight, more preferably from 0.0005 to 0.08 parts by weight, and further more preferably from 0.001 to 0.05 parts by weight, to 100 parts by weight of such polymerizable component. Insufficient amount of the water-soluble compound may result in insufficient effect by the water-soluble compound. Excessive amount of the water-soluble compound may decrease polymerization rate, increase the amount of raw material, i.e., the polymerizable component, remaining after polymerization, or produce fragile thermoplastic resin forming the shell of microspheres to adversely affect on the expanding performance of the microspheres.

As mentioned above, the water-soluble compounds are used as a polymerization auxiliary, and inherently have a function to prevent the coagulation of heat-expandable microspheres generated in polymerization and the generation of scale in a polymerization reactor (more specifically, aggregate formed by polymer firmly sticking on the outside of the shell of heat-expandable microspheres, filter clogging by polymer, and polymer sticking on the inside of a polymerization reactor, which are found in the polymerization of a polymerizable component). With such water-soluble compounds, the production method of the present invention is excellent in prevention of coagulation of heat-expandable microspheres produced in polymerization, and prevention of scale generation in a polymerization reactor.

In the present invention, the water-soluble compounds may be used in combination with other polymerization auxiliaries. Other polymerization auxiliaries include dichromates, such as ammonium dichromate, sodium dichromate, and potassium dichromate; alkali metal nitrites, such as sodium nitrite and potassium nitrite; and polymerization inhibitors, such as water-soluble ascorbic acid and its derivatives. Alkali metal nitrites are regulated by the Ordinance for Water Pollution Control Law for enforcing the Water Pollution Control Law of Japan. The ordinance defines the limit values of hazardous materials contained in ground water, and the limit of the sum of the amount of nitrite nitrogen and nitrate nitrogen is defined as 10 ppm. Thus in the conventional production methods for heat-expandable microspheres, in which nitrite salts are employed, waste water from reaction must be diluted with a lot of water or treated with active carbon or ion-exchange resin to absorb nitrite salts for the purpose of exhausting the waste water, in case that the amount of the nitrite salts in the waste water is higher than the limit.

In the production method of the present invention, the polymerizable component is polymerized in the presence of the water-soluble compound, and the process is effective to efficiently encapsulate a blowing agent, which is added in the production process, in heat-expandable microspheres without loss. In the production method of the present invention, the efficiency of retention (%), the calculation of which is specifically described in Examples, should preferably not lower than 88%, more preferably not lower than 90%, and further more preferably not lower than 95%.

The aqueous dispersing medium may contain the electrolyte, dispersion stabilizer, and dispersion stabilizing auxiliary mentioned above.

The dispersion stabilizer is not specifically restricted, and includes, for example, colloidal silica, colloidal calcium carbonate, magnesium hydroxide, calcium hydroxide, aluminum hydroxide, ferric hydroxide, calcium sulfate, barium sulfate, calcium oxalate, calcium methasilicate, calcium carbonate, barium carbonate, magnesium carbonate; phosphate salts such as calcium phosphate, magnesium phosphate, aluminum phosphate, and zinc phosphate; pyrophosphate salts such as calcium pyrophosphate, aluminum pyrophosphate, and zinc pyrophosphate, and poorly water-soluble inorganic compounds such as alumina sol. One of or a combination of at least two of those dispersion stabilizers may be used, and their variants are selected according to the intended particle size of resultant heat-expandable microspheres and the stability of dispersion in polymerization. Above all, calcium triphosphate, pyrophosphates obtained in metathesis reaction such as magnesium pyrophosphate and calcium pyrophosphate, and colloidal silica are preferable.

The amount of the dispersion stabilizer is properly determined according to a target particle size and is not specifically restricted. The amount should preferably range from 0.1 to 20 parts by weight, more preferably from 2 to 10 parts by weight, to 100 parts by weight of a polymerizable component.

The dispersion stabilizing auxiliary is not specifically restricted, and includes, for example, polymer type dispersion stabilizing auxiliaries; and surfactants, such as cationic surfactants, anionic surfactants, amphoteric surfactants, and nonionic surfactants. One of or a combination of at least two of the dispersion stabilizing auxiliaries may be employed, and they are selected according to the particle size of resultant heat-expandable microspheres and the stability of dispersion in polymerization.

The polymer type dispersion stabilizing auxiliaries include, for example, a condensate of diethanolamine and an aliphatic dicarboxylic acid, gelatin, polyvinyl pyrolidone, methyl cellulose, polyethylene oxide, and polyvinyl alcohol.

The amount of the dispersion stabilizing auxiliaries is not specifically restricted, and should preferably range from 0.0001 to 5 parts by weight, more preferably from 0.0003 to 2 parts by weight, to 100 parts by weight of a polymerizable component.

The aqueous dispersing medium is prepared by blending the water-soluble compound and optionally an electrolyte, the dispersion stabilizer, and the dispersion stabilizing auxiliary in water, such as deionized water. The pH of the aqueous dispersing medium in polymerization is properly determined according to the ingredients. The aqueous dispersing medium in polymerization may either be acidic, neutral, or alkaline, and should preferably be acidic or neutral, more preferably acidic. The pH of the aqueous dispersing medium in polymerization should normally range from 2 to 13, preferably from 2 to 10, more preferably from 2 to 8, further preferably from 2 to 6.5, further more preferably from 2 to 6, and most preferably from 2 to 4.

In the method of the present invention, a polymerizable component essentially containing a monomer component and optionally containing a cross-linking agent, a blowing agent, a polymerization initiator, an aqueous dispersing medium essentially containing water, an electrolyte, a polymerization auxiliary including a water-soluble additive, a dispersion stabilizer, and a dispersion stabilizing auxiliary mentioned above are mixed, and the polymerizable component is polymerized. The order for mixing these components is not specifically restricted, and the components soluble or dispersible in the aqueous dispersing medium may be mixed in the medium before they are mixed with other components.

In the present invention, an oily mixture of a polymerizable component and blowing agent is dispersed and emulsified in an aqueous dispersing medium so as to form oil globules of an intended particle size.

The methods for dispersing and emulsifying the oily mixture include generally known dispersion techniques, such as agitation with a Homo-mixer (for example, those manufactured by Tokushu Kika Kogyou) and a Homo-disper (for example, those manufactured by Tokushu Kika Kogyou), dispersion with a static dispersing equipment such as a Static mixer (for example, those manufactured by Noritake Engineering Co., Ltd.), membrane emulsification technique, ultrasonic dispersion, and microchannel emulsification.

Then the suspension polymerization is started by heating the dispersion in which the oily mixture is dispersed into oil globules in the aqueous dispersing medium. It is preferable to agitate the dispersion during the polymerization reaction, and the agitation should be performed gently to a degree which prevents the floating of monomers and sedimentation of polymerized heat-expandable microspheres.

The polymerization temperature may be freely settled according to the variant of a polymerization initiator, and should preferably be controlled within the range from 30 to 100 deg. C., more preferably from 40 to 90 deg. C., and further more preferably from 50 to 85 deg. C. The reaction temperature should preferably be maintained for about 0.1 to 20 hours. Initial polymerization pressure is not specifically restricted, and should preferably be controlled within the range from 0 to 5.0 MPa in gauge pressure, more preferably from 0.1 to 3.0 MPa, and further more preferably from 0.2 to 2.0 MPa.

After the polymerization reaction, the dispersion stabilizer may be optionally decomposed with hydrochloric acid and the like, and the resultant product (heat-expandable microspheres) is separated from the dispersion with some operation, such as suction filtration, centrifugal separation, or centrifugal filtration. Further the resultant wet cake of heat-expandable microspheres is washed with water and dried to obtain heat-expandable microspheres.

The method of producing heat-expandable microspheres of the present invention may further contain a step of adhering a particulate filler on the outer surface of the shell of the microspheres. A particulate filler adhered onto the outer surface of the shell of the microspheres contributes to improved dispersibility and flowability of the microspheres in use.

The particulate filler may be either an organic or an inorganic filler, and the variant and amount of the particulate filler are selected according to the application of the microspheres.

The organic particulate filler includes, for example, metal soaps, such as magnesium stearate, calcium stearate, zinc stearate, barium stearate, and lithium stearate; synthetic waxes, such as polyethylene wax, lauric acid amide, myristic acid amide, palmitic acid amide, stearic acid amide, and hydrogenated castor oil; and resin powders, such as polyacrylamide, polyimide, nylon, poly(methyl methacrylate), polyethylene, and polytetrafluoroethylene.

The examples of inorganic particulate fillers are those having a layered structure, such as talc, mica, bentonite, sericite, carbon black, molybdenum disulfide, tungsten disulfide, carbon fluoride, calcium fluoride, and boron nitride; and others, such as silica, alumina, isinglass, calcium carbonate, calcium hydroxide, calcium phosphate, magnesium hydroxide, magnesium phosphate, barium sulfate, titanium dioxide, zinc oxide, ceramic beads, glass beads, and crystal beads.

One of or a combination of at least two of the particulate fillers may be employed.

The average particle size of the particulate fillers is preferably not greater than one tenth of the average particle size of heat-expandable microspheres before adhering the particulate fillers. The average particle size mentioned here means the average particle size of primary particles.

The amount of a particulate filler adhered onto the heat-expandable microspheres is not specifically restricted, and should preferably range from 0.1 to 95 parts by weight, more preferably from 0.5 to 60 parts by weight, further preferably from 5 to 50 parts by weight, and most preferably from 8 to 30 parts by weight, to 100 parts by weight of heat-expandable microspheres before adhering the filler, considering the true specific gravity of heat-expandable microspheres and for optimizing the function of the particulate filler.

A particulate filler may be adhered onto heat-expandable microspheres by mixing heat-expandable microspheres and the particulate filler. The mixing process is not specifically restricted, and a device of a very simple mechanism, such as a vessel and paddle blades, is employable. Ordinary powder mixers for shaking or agitating powders are also applicable. The powder mixers include those that can shake and agitate, or agitate powders, such as ribbon-type mixers and vertical screw mixers. Highly efficient multi-functional powder mixers recently manufactured by combining several agitation devices, such as Super Mixer (manufactured by Kawata MFG Co., Ltd.), High-Speed Mixer (manufactured by Fukae Co., Ltd.), New-Gram Machine (manufactured by Seishin Enterprise Co., Ltd.), and SV mixer (manufactured by KOBELCO Eco-Solutions Co., Ltd.) may be used.

[Heat-Expandable Microspheres and their Application]

The heat-expandable microspheres of the present invention, as shown in FIG. 1, have a core-shell structure which comprises a shell 11 of thermoplastic resin and a blowing agent (core) 12 encapsulated therein gasifying at a temperature not higher than the softening point of the thermoplastic resin, and the heat-expandable microspheres exhibit thermal expanding performance in whole (or a property of expanding under heating in whole). The thermoplastic resin, the polymerizable component which polymerizes to form thermoplastic resin, and the blowing agent are those described above.

The maximum expanding ratio of heat-expandable microspheres of the present invention is not lower than 50 times, preferably not lower than 55 times, more preferably not lower than 60 times, further preferably not lower than 65 times, further more preferably not lower than 70 times, and most preferably not lower than 75 times. Heat-expandable microspheres having a maximum expanding ratio lower than 50 times are not preferable, because such microspheres have poor thermal expanding performance, insufficiently increase their volume when they are thermally expanded, and may result in poor retention of a blowing agent and poor solvent resistance.

The expanding ratio is usually the most basic property of heat-expandable microspheres, and an indispensable property for heating and expanding heat-expandable microspheres to produce hollow particulates to be employed for lightening application or increasing volume. The expanding ratio is given with various definitions, and the maximum expanding ratio is defined as the percentage calculated by dividing the true specific gravity of hollow particulates at their maximum expansion by the true specific gravity of heat-expandable microspheres before expansion.

High expanding ratio of heat-expandable microspheres at their maximum expansion means that such heat-expandable microspheres can retain a blowing agent encapsulated in their shell without leakage even if the shell becomes thinner with the advancement of expansion. In other words, high expanding ratio of heat-expandable microspheres at their maximum expansion means that shell of excellent property having high expanding and blowing-agent-retaining performances is formed. Heat-expandable microspheres having shell of excellent property are known to have high solvent resistance and not to lose their heat-expanding performance when they are exposed to various solvents. Thus the expanding ratio of heat-expandable microspheres at their maximum expansion is a very important property for evaluating the properties of heat-expandable microspheres.

The hollow particulates obtained by thermally expanding the heat-expandable microspheres of the present invention should have a repeated-compression durability not lower than 75 percent, preferably not lower than 78 percent, more preferably not lower than 80 percent, further preferably not lower than 83 percent, further more preferably not lower than 85 percent, and most preferably not lower than 88 percent. If heat-expandable microspheres are converted into hollow particulates having a repeated-compression durability lower than 75%, such heat-expandable microspheres result in reduction in the properties, such as lightening effect, porosity, sound absorbency, thermal insulation performance, thermal conductivity, design effect, and strength, of molded articles or formed materials like coating film which are produced from the heat-expandable microspheres. In addition, such microspheres are converted into hollow particulates which have poor performance for retaining a blowing agent and poor solvent resistance.

The repeated-compression resistance of hollow particulates, which are produced by thermally expanding heat-expandable microspheres and have a true specific gravity within the range of 0.025+/−0.001 g/cc, is determined according to the measuring method explained in detail in Examples. Hollow particulates for measuring their repeated-compression durability are produced by thermally expanding heat-expandable microspheres in the internal jetting method, one of dry thermal expanding methods mentioned below as in Examples. The internal jetting method is employed because dry hollow particulates are obtained without a step of drying hollow particulates, the step which is contained in wet thermal expanding method, and the resultant hollow particulates have excellent dispersibility.

Heat-expandable microspheres before expansion usually have a true specific gravity about 1 g/cc. The maximum expanding ratio of the heat-expandable microspheres of the present invention is not lower than 50 times, and thus the resultant hollow particulates have a true specific gravity about 0.02 g/cc or less when the microspheres expand to their maximum. Actually, hollow particulates having a true specific gravity of about 0.02 g/cc do not clearly exhibit the difference between superior and inferior particulates in the evaluation of repeated-compression durability. On the other hand, hollow particulates having a true specific gravity within the range of 0.025+/−0.001 g/cc, which possibly have not been expanded to their maximum, are easily tested in the evaluation of repeated-compression durability to clearly exhibit the difference between superior and inferior particulates because of their insufficient expansion. With these reasons, hollow particulates having a true specific gravity within the range of 0.025+/−0.001 g/cc is subjected to the determination of repeated-compression durability.

The repeated-compression durability is a physical property for evaluating the durability of hollow particulates against the stress generated in mixing a base component mentioned below and hollow particulates or in forming a composition comprising the base component and hollow particulates. Evaluation of the repeated-compression durability of hollow particulates is equal to the evaluation of the durability of the shell of hollow particulates against repeated bending. High durability of a shell of hollow particulates against repeated bending means that the shell of the hollow particulates is formed of materially uniform thermoplastic resin, and does not locally become fragile when it is bent repeatedly. The materially uniform shell of hollow microspheres means that the shell of the raw material of such hollow particulates, i.e., heat-expandable microspheres, is really formed in good quality with uniform material. It has already been found that heat-expandable microspheres having a shell of good quality and uniform material have high solvent resistance and do not lose thermal expanding performance even after they are exposed to various solvents. On the contrary, a shell of non-uniform material containing fragile parts may lead to reduced thermal expanding performance of microspheres, because such shell results in shooting of a blowing agent through the fragile parts or swelling of the shell which starts from the fragile parts when the shell is exposed to various solvents.

As mentioned above, hollow particulates and/or their raw material, i.e., heat-expandable microspheres, which have high repeated-compression durability, exhibit high durability against the stress generated in mixing the hollow particulates and/or heat-expandable microspheres with a base component or the stress generated in molding or coating a composition comprising a base component and the hollow particulates and/or heat-expandable microspheres, and are not easily ruptured from the stress.

Further, the heat-expandable microspheres should preferably have the following properties.

The average particle size of the heat-expandable microspheres may be freely designed according to their application, and therefore is not specifically restricted. The average particle size normally ranges from 1 to 100 micrometer, preferably from 2 to 80 micrometer, more preferably from 3 to 60 micrometer, and further more preferably from 5 to 50 micrometer.

The coefficient of variation, CV, of the particle size distribution of heat-expandable microspheres is not specifically restricted, and is preferably 35 percent or less, more preferably 30 percent or less, and further more preferably 25 percent or less. The coefficient of variation, CV, is calculated by the following expressions (1) and (2):

[Expression 1]

$$CV = (S/<x>) \times 100 \text{ (percent)} \qquad (1)$$

$$s = \left\{ \sum_{i=1}^{n} (xi - <x>)^2 / (n-1) \right\}^{1/2} \qquad (2)$$

where S is a standard deviation of particle size, <x> is an average particle size, xi is a particle size of an i-th particulate, and n is the number of particulates.

The retention of a blowing agent encapsulated in heat-expandable microspheres is designed freely according to their application and is not specifically restricted. The retention should preferably range from 2 to 60 weight percent to the weight of heat-expandable microspheres, more preferably from 5 to 50 weight percent, and further more preferably from 8 to 45 weight percent.

The heat-expandable microspheres of the present invention can be produced in the production method mentioned above, though the method is not restricted within the scope of the production method. The heat-expandable microspheres of the present invention may be produced in other methods, for example, interfacial polymerization, reversed-phase emulsification, and emulsion polymerization. In addition, they may be produced in a method without making globules in an aqueous dispersing medium, for example, submerged drying, coacervation, spray drying, and dry mixing. Further they may be produced by graft-polymerizing a polymer on the shell of heat-expandable microspheres produced in a method which is different from the method of the present invention.

Thermally expanded microspheres (hollow particulates) are produced by heating and expanding the heat-expandable microspheres of the present invention and/or the heat-expandable microspheres produced in the production method of the present invention. The production method for the hollow particulates is not specifically restricted, and either dry heating-expanding method or wet heating-expanding method is employed.

An example of the dry heating-expanding method is the internal jetting method described in JP A 2006-213930. The internal jetting method is a dry heating-expanding method, which comprises the steps of feeding a gas fluid containing heat-expandable microspheres through a gas-introducing tube having a dispersion nozzle on its outlet and being fixed inside hot gas flow, and then jetting the gas fluid from the dispersion nozzle (jetting step); making the gas fluid collide on a collision plate fixed at a downstream position of the dispersion nozzle to disperse the heat-expandable microspheres in the hot gas flow (dispersing step); and heating the dispersed heat-expandable microspheres in the hot gas flow at a temperature not lower than their expansion-initiating temperature so as to expand the heat-expandable microspheres (expanding step). The internal jetting method is preferable because it produces hollow particulates of uniform property regardless of the variants of thermoplastic resin forming the shell of the raw material, i.e., heat-expandable microspheres. The detail of the internal jetting method is described in an Example.

Another dry heating-expanding method is described in JP A 2006-96963, and a wet heating-expanding method is described in JP A 62-201231.

The average particle size of the hollow particulates may be freely designed according to their application, and therefore is not specifically restricted. The average particle size should preferably range from 1 to 1000 micrometer, more preferably from 5 to 800 micrometer, and further more preferably from 10 to 500 micrometer. The coefficient of variation, CV, of the particle size distribution of the hollow particulates is not specifically restricted, and should preferably be 30 percent or less, more preferably 27 percent or less, and further more preferably 25 percent or less.

The composition of the present invention comprises a base component and heat-expandable microspheres and/or hollow particulates.

The base component is not specifically restricted, and includes, for example, rubbers, such as natural rubber, butyl rubber, and silicone rubber; thermosetting resins, such as epoxy resins and phenol resins; sealing materials, such as modified silicone, urethane, polysulfide, acrylic, and silicone polymers; paint components, such as ethylene-vinyl acetate copolymer, vinyl chloride polymer, and acrylic polymer; and inorganic materials, such as cement, mortar, and cordierite. The composition of the present invention is prepared by mixing the base component and heat-expandable microspheres and/or hollow particulates.

The application of the composition of the present invention includes, for example, a molding composition, paint composition, clay composition, fiber composition, adhesive composition, and powder composition.

The formed products of the present invention are produced by molding or forming the composition. The formed products of the present invention include, for example, molded articles and formed products like coating film. The formed products of the present invention have improved lightening effect, porosity, sound absorbency, thermal insulation performance, thermal conductivity, electrical conductivity, design effect, shock absorption performance, and strength.

EXAMPLES

The present invention is described specifically with the following Examples and Comparative examples, though the present invention is not restricted within the scope of those examples.

The properties of the heat-expandable microspheres and hollow particulates produced in the following Examples and Comparative examples were measured in the following procedures, and their performance was also evaluated in the following procedures.

[Determination of Average Particle Size and Particle Size Distribution]

A laser diffraction particle size analyzer (HEROS & RODOS, manufactured by SYMPATEC) was employed as the device for the determination. Microspheres were analyzed in dry system with a dry dispersion unit, where the dispersion pressure was controlled at 5.0 bar and the degree of vacuum was controlled at 5.0 mbar. The median particle size (D50 value) was determined as an average particle size.

[Determination of Moisture Content of Heat-Expandable Microspheres]

The moisture content was determined with a Karl Fischer moisture meter (MKA-510N, produced by Kyoto Electronics Manufacturing Co., Ltd.).

[Determination of Retention of Blowing Agent Encapsulated in Heat-Expandable Microspheres]

One gram of heat-expandable microspheres was placed in a stainless steel evaporating dish (15 mm deep and 80 mm in diameter), and weighed out ($W_1$). Then 30 ml of acetonitrile was added to disperse the microspheres uniformly. After being left for 30 minutes at room temperature, the microspheres were dried at 120 degree. C. for 2 hours, and the dry weight ($W_2$) was determined. The retention of encapsulated blowing agent was calculated by the following expression.

Retention of encapsulated blowing agent (weight percent)=$(W_1-W_2)(g)/1.0 (g) \times 100$−(moisture content)(weight percent)

(The moisture content in the expression was determined by the method described above.)

[Calculation of Efficiency of Retention]

The efficiency of retention of a blowing agent is defined as the ratio between the weight ratio ($G_1$) of a blowing agent to the total of the weight of a polymerizable component and the blowing agent before polymerization, and the retention ($G_2$) of the blowing agent encapsulated in heat-expandable microspheres produced by polymerizing the polymerizable component and the blowing agent. The efficiency of retention is calculated by the following expression.

Efficiency of retention (percent)=$G_2/G_1 \times 100$

[Determination of True Specific Gravity]

The true specific gravity of heat-expandable microspheres and hollow particulates obtained by thermally expanding the microspheres was determined in the following method.

The true specific gravity was determined with the liquid substitution method (Archimedean method) with isopropyl alcohol in an atmosphere at 25 degree. C. and 50% RH (relative humidity).

Specifically, an empty 100-cc measuring flask was dried and weighed ($WB_1$), isopropyl alcohol was poured into the weighed measuring flask accurately to form a meniscus, and the measuring flask filled with isopropyl alcohol was weighed ($WB_2$).

Then the 100-cc measuring flask was emptied, dried, and weighed ($WS_1$). The weighed measuring flask was filled with about 50 cc of particles, and the measuring flask filled with the particles was weighed ($WS_2$). Then isopropyl alcohol was poured into the measuring flask filled with the particles accurately to form the meniscus without making bubbles in the isopropyl alcohol, and the flask filled with the particles and isopropyl alcohol was weighed ($WS_3$). The values, $WB_1$, $WB_2$, $WS_1$, $WS_2$, and $WS_3$, were introduced into the following expression to calculate the true specific gravity (d) of the particles.

$d=\{(WS_2-WS_1) \times (WB_2-WB_1)/100\}/\{(WB_2-WB_1)-(WS_3-WS_2)\}$

Heat-expandable microspheres and hollow particulates were tested as the particles in the above-mentioned method to calculate their true specific gravity.

[Determination of Expansion-Initiating Temperature and Maximum-Expanding Temperature]

Those properties were determined with DMA (a kinetic viscoelasticity measuring device: DMA Q800, manufactured by TA Instruments). In an aluminum cup 4.8 mm deep and 6.0 mm in diameter (5.65 mm in inside diameter), 0.5 mg of heat-expandable microspheres were placed, and an aluminum lid 0.1 mm thick and 5.6 mm in diameter was placed on the cup to prepare a sample. The sample was subjected to a pressure of 0.01 N with the compression unit of the device, and the height of the sample was measured. The sample was then heated at a temperature range from 20 to 300 degree. C. elevating at the rate of 10 degree. C./min, being subjected to the pressure of 0.01 N with the compression unit, to determine the vertical change of the position of the compression unit. The temperature at which the compression unit started to change its position to the positive direction was determined as an expansion-initiating temperature, and the temperature at which the compression unit indicated the greatest change was determined as the maximum-expanding temperature.

[Determination of True Specific Gravity of Microspheres at Maximum Expansion]

A flat 12 cm long, 13 cm wide, and 9 cm high box was made of aluminum foil, and 1.0 g of heat-expandable microspheres was filled into uniform thickness. Then the heating of the microspheres was started at the expansion initiating temperature obtained in the measuring method mentioned above. The heating temperature was repeatedly raised by 5 deg. C. and maintained for 1 minute to heat the microspheres, and at each step of temperature raising the true specific gravity of the expanded microspheres (hollow particulates) was determined in the same manner as in the determination method of true specific gravity mentioned above. The lowest true specific gravity among the results was determined as the true specific gravity of the microspheres at their maximum expansion.

[Evaluation of Expanding Ratio of Microspheres at their Maximum Expansion]

The expanding ratio (times) of microspheres at their maximum expansion was calculated by introducing the true specific gravity of heat-expandable microspheres before expanding ($d_c$) and the true specific gravity of the microspheres at their maximum expansion ($d_{max}$), which were determined in the same manner as that for determining the true specific gravity mentioned above, in the following expression.

Expanding ratio at maximum expansion (times)=$d_c/d_{max}$

[Repeated-Compression Durability]

Figure 2:
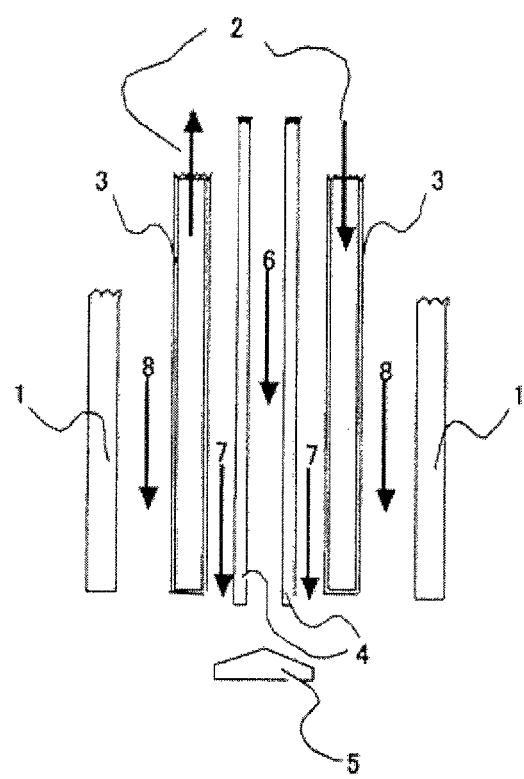

As mentioned above, the internal jetting method described in JP A 2006-213930 was employed for producing hollow particulates to determine their repeated-compression durability. Specifically, the production was carried out in the following procedure with the manufacturing equipment equipped with the expanding device shown in FIG. 2. Then the repeated-compression durability of the resultant hollow particulates was determined in the following method.

(Description of Expanding Device)

The expanding device comprises a gas introducing tube (without a reference numeral) equipped with a dispersion nozzle 4 on its outlet and fixed at the center of the equipment, a collision plate 5 set at a downstream position of the dispersion nozzle 4, an overheating preventive tube 3 fixed around the gas introducing tube with some distance, and a hot gas nozzle 1 fixed around the overheating preventive tube 3 with some distance. At the expanding device, a gas fluid 6 containing heat-expandable microspheres is flowed through the gas introducing tube in the direction marked with the arrow, and a gas flow 7 is flowed through the space between the gas introducing tube and the overheating preventive tube 3 in the direction marked with the arrow in order to improve the dispersion of heat-expandable microspheres and to prevent the overheating of the gas introducing tube and collision plate. In addition, hot gas flow 8 for thermal expansion is supplied in the direction marked with the arrow in the space between the overheating preventive tube 3 and the hot gas nozzle 1. Here the hot gas flow 8, gas fluid 6, and gas flow 7 usually flow in the same direction. In the overheating preventive tube 3, cooling medium flow 2 is flowed in the direction marked with the arrow for cooling.

(Operation of Manufacturing Equipment)

At the jetting step, the gas fluid 6 containing heat-expandable microspheres was flowed through the gas introducing tube, which was equipped with the dispersion nozzle 4 on its outlet and fixed at the inside of the hot gas flow 8, and was jetted from the dispersion nozzle 4.

At the dispersing step, the gas fluid 6 collided to the collision plate 5 fixed at a downstream position of the dispersion nozzle 4 so as to disperse the heat-expandable microspheres uniformly in the hot gas flow 8. The gas fluid 6 emitted from the dispersion nozzle 4 was lead to the collision plate 5 with the gas flow 7, and was made to collide with the plate.

At the expanding step, the dispersed heat-expandable microspheres were heated and expanded in the hot gas flow 8 at a temperature not lower than the expansion-initiating temperature of the microspheres. Then the resultant hollow particulates were cooled with some means, such as passing them through a cooling zone, and collected.

(Method of Setting the Production Parameters for Hollow Particulates)

At first, the parameters including the feeding rate of raw material heat-expandable microspheres, flow rate of hot gas, and amount of gas fluid containing the raw material, were settled at prescribed values, and the temperature of hot gas flow (hereinafter sometimes referred to as "hot gas temperature") was settled variable. Then the hot gas temperature was raised stepwisely to expand heat-expandable microspheres at varied temperature levels, while other parameters were settled at prescribed values. Then the true specific gravity of the resultant particulates was determined, and a graph showing the relation between the hot gas temperature and the true specific gravity was prepared by plotting the hot gas temperature on x-axis and the true specific gravity on y-axis.

For producing expanded microspheres having an intended true specific gravity (within the range of 0.025+/−0.001 g/cc), the hot gas temperature was settled at the level corresponding to the intended true specific gravity on the graph mentioned above. Thus hollow particulates having a true specific gravity within the range of 0.025+/−0.001 g/cc were produced with the expanding parameters controlled in such manner.

[Determination of Repeated-Compression Durability]

In an aluminum cup 4.8 mm deep and 6 mm in diameter (having an inside diameter of 5.65 mm), 2.00 mg of hollow particulates obtained in the above procedure were placed, and an aluminum lid 0.1 mm thick and 5.6 mm in diameter was placed on the hollow particulates to prepare a sample. Then the sample was tested with DMA (DMA Q800, produced by TA Instruments), which compressed the sample on the aluminum lid with its compression unit to subject the sample to a pressure of 2.5 N at 25 degree. C., and determined the thickness of the layer of the hollow particulates, $L_1$. Then the pressure was raised from 2.5 N to 18 N at a rate of 10 N/min, followed with the reduction of the pressure from 18 N to 2.5 N at a rate of 10 N/min. After repeating the pressure raising and reducing operation 7 times, the thickness of the layer of the hollow particulates, $L_2$, was determined while the layer was compressed with a pressure of 2.5 N on the aluminum lid by the compression unit. Then the ratio between $L_1$ and $L_2$, which are the thickness of the layers of the hollow particulates mentioned above, was defined to be the repeated-compression durability calculated by the following expression.

Repeated-compression durability (percent)=$(L_2/L_1) \times 100$

[Determination of Density of Formed Products]

The density of a formed product was determined with an Analytical balance AX 200 and a Specific gravity measuring kit SMK-301 manufactured by Shimadzu Corporation.

[Calculation of Lightened Ratio of Formed Expanded Products]

The density of a formed resin product $D_B$ (g/cm$^3$) and the density of a resin containing no heat-expandable microspheres $D_A$ (g/cm$^3$) were determined in the same manner as in the determination of the density of formed products mentioned above. The result was introduced in the following expression and calculated.

Lightened ratio (%)=$((D_A-D_B)\times 100/D_A)$

Example A1

An aqueous dispersing medium was prepared by adding 100 g of sodium chloride, 80 g of colloidal silica containing 20 weight percent of silica as effective ingredient, 0.1 g of polyvinylpyrolidone, and 1 g of 1-% aqueous solution of a polyethyleneimine (having a substituted alkyl group (A) of —CH$_2$COONa with 80-% substitution ratio, and a weight average molecular weight of 50,000) to 600 g of deionized water, and controlling the pH of the mixture at 2.8 to 3.2.

Apart from it, an oily mixture was prepared by mixing 180 g of acrylonitrile, 105 g of methacrylonitrile, 15 g of methyl methacrylate, 1.5 g of ethyleneglycol dimethacrylate, 75 g of isopentane, and 1 g of 2,2'-azobisisobutyronitrile. The aqueous dispersing medium and the oily mixture were mixed, and the mixed liquid was dispersed into a suspension with a Homomixer (T.K. Homo-mixer manufactured by Tokushu Kika Kogyou) at a mixer rotational rate of 5000 rpm for 5 minutes. Then the suspension was transferred into a compressive reactor of 1.5 liter capacity, purged with nitrogen, and polymerized at 70 deg. C. for 20 hours by agitating at 80 rpm and controlling the initial reaction pressure at 0.5 MPa. After the polymerization, the polymerized product was filtered and dried to obtain heat-expandable microspheres.

The suspension in the polymerization reaction was stable enough, and the reaction mixture after the polymerization was in good state without abnormal properties. When the reaction mixture was drawn out after the polymerization, no polymerized products sticking on the inside wall of the reactor were observed. The properties of the resultant heat-expandable microspheres are described in Table 1.

Examples A2 to A18 and Comparative Examples A1 to A8

In Examples A2 to A18 and Comparative examples A1 to A8, heat-expandable microspheres were produced by polymerizing in the same manner as in Example A1 except that each of the reacting conditions was changed as shown in Tables 1 to 5.

The properties of the resultant heat-expandable microspheres are described in Tables 1 to 5 in the same manner as in Example A1. In the Comparative examples A1 and A2, most of the resultant polymerized products coagulated and/or solidified, and the properties of the resultant heat-expandable microspheres could not be determined.

As in Comparative example A3, the reaction with sodium nitrite brought satisfactory result, though about 90 ppm of nitrite ion was detected in the filtrate after draining the reacted slurry. Such nitrite ion concentration did not meet the limit value of 10 ppm for the sum of nitrite nitrogen and nitrate nitrogen, which is defined as a limit value for hazardous materials in ground water regulated by the Ordinance for Water Pollution Control Law. Thus the filtrate had to be further diluted or treated with active carbon or ion-exchange resin to adsorb the nitrite ion.

Example B1

An aqueous dispersing medium was prepared by adding 20 g of sodium chloride, 80 g of colloidal silica containing 20 weight percent of silica as effective ingredient, 3 g of diethanol-amine-adipic-acid condensate (50 weight percent concentration), 1 g of 1-% aqueous solution of a polyethyleneimine (having a substituted alkyl group (A) of —CH$_2$COONa with 80-% substitution ratio, and a weight average molecular weight of 50,000), and 2 g of 1-% aqueous solution of 2-carboxypyridine to 600 g of deionized water, and controlling the pH of the mixture at 2.8 to 3.2.

Apart from it, an oily mixture was prepared by mixing 160 g of acrylonitrile, 100 g of methyl methacrylate, 40 g of methyl acrylate, 1.0 g of ethyleneglycol dimethacrylate, 80 g of isobutane, and 2 g of di(2-ethylhexyl) peroxidicarbonate. The aqueous dispersing medium and the oily mixture were mixed, and the mixed liquid was dispersed into a suspension with a Homomixer (T.K. Homo-mixer manufactured by Tokushu Kika Kogyou) at a mixer rotational rate of 8000 rpm for 5 minutes. Then the suspension was transferred into a compressive reactor of 1.5 liter capacity, purged with nitrogen, and polymerized at 55 deg. C. for 20 hours by agitating at 80 rpm and controlling the initial reaction pressure at 0.5 MPa. After the polymerization, the polymerized product was filtered and dried to obtain heat-expandable microspheres.

The suspension in the polymerization reaction was stable enough, and the reaction mixture after the polymerization was in good state without abnormal properties. When the reaction mixture was drawn out after the polymerization, no polymerized products sticking on the inside wall of the reactor were observed. The properties of the resultant heat-expandable microspheres are described in Table 6.

Examples B2 to B11

In Examples B2 to B11, heat-expandable microspheres were produced by polymerizing in the same manner as in Example B1 except that each of the reacting conditions was changed as shown in Tables 6 and 7.

The properties of the resultant heat-expandable microspheres are shown in Tables 6 and 7 in the same manner as in Example B1.

TABLE 1

|  |  |  | Example | | | | Comparative example | | |
| --- | --- | --- | --- | --- | --- | --- | --- | --- | --- |
|  |  |  | A1 | A2 | A3 | A4 | A1 | A2 | A3 |
| Aqueous dispersing medium | Water soluble compound | Variant | CMPEI | CEPEI | CMPPI | PMPEI | none | Sodium ascorbate | Sodium nitrite |
|  |  | 1-% aq. soln. (g) | 1 | 2 | 2 | 1 | — | 1 | 15 |
|  | Deionized water (g) |  | 600 | 600 | 600 | 600 | 600 | 600 | 600 |
|  | NaCl (g) |  | 100 | 100 | 100 | 100 | 100 | 100 | 100 |
|  | Colloidal silica (g) |  | 80 | 80 | 80 | 80 | 80 | 80 | 80 |

TABLE 1-continued

|  |  | Example |  |  |  | Comparative example |  |  |
|---|---|---|---|---|---|---|---|---|
|  |  | A1 | A2 | A3 | A4 | A1 | A2 | A3 |
|  | PVP (g) | 0.1 | 0.1 | 0.1 | 0.1 | 0.1 | 0.1 | 0.1 |
|  | pH | 3.0 | 3.0 | 3.0 | 3.0 | 3.0 | 3.0 | 3.0 |
| Monomer | AN (g) | 180 | 180 | 180 | 180 | 180 | 180 | 180 |
| component | MAN (g) | 105 | 105 | 105 | 105 | 105 | 105 | 105 |
|  | MMA (g) | 15 | 15 | 15 | 15 | 15 | 15 | 15 |
| Cross-linking agent | EDMA (g) | 1.5 | 1.5 | 1.5 | 1.5 | 1.5 | 1.5 | 1.5 |
| Blowing agent | Isopentane (g) | 75 | 75 | 75 | 75 | 75 | 75 | 75 |
| Initiator | AIBN (g) | 1 | 1 | 1 | 1 | 1 | 1 | 1 |
| Mixer rotating speed (rpm) |  | 5000 | 5000 | 5000 | 5000 | 5000 | 5000 | 5000 |
| Polymerization temp. (deg. C.) |  | 70 | 70 | 70 | 70 | 70 | 70 | 70 |
| Average particle size (μm) |  | 34 | 33 | 32 | 33 | — | — | 33 |
| Retention (wt %) |  | 19.5 | 19.1 | 19.2 | 18.7 | — | — | 17.1 |
| Efficiency of retention (%) |  | 98 | 96 | 96 | 94 | — | — | 86 |
| Maximum expanding ratio (times) |  | 74 | 70 | 68 | 65 | — | — | 47 |
| Repeated-compression durability (%) |  | 88 | 90 | 87 | 86 | — | — | 65 |
| Stability of suspension in polymerization |  | good | good | good | good | poor | poor | good |
| Polymerized product sticking on wall inside a reactor |  | none | none | none | none | sticking | sticking | none |
| State of reaction mixture after polymerization |  | *1 | *1 | *1 | *1 | *2 | *2 | *1 |

TABLE 2

|  |  |  | Example |  |  |  |  |
|---|---|---|---|---|---|---|---|
|  |  |  | A5 | A6 | A7 | A8 | A9 |
| Aqueous dispersing medium | Water soluble compound | Variant | CMPEI | CEPEI | CMPPI | PMPEI | CMPEI |
|  |  | 1-% aq. soln. (g) | 1 | 2 | 2 | 5 | 2 |
|  | Deionized water (g) |  | 600 | 600 | 600 | 600 | 600 |
|  | NaCl (g) |  | 100 | 100 | 100 | 100 | 100 |
|  | Colloidal silica (g) |  | 80 | 80 | 80 | 80 | 80 |
|  | PVP (g) |  | 0.1 | 0.1 | 0.1 | 0.1 | 0.1 |
|  | pH |  | 3.0 | 3.0 | 3.0 | 3.0 | 3.0 |
| Monomer component | AN (g) |  | 180 | 180 | 180 | 180 | 180 |
|  | MAN (g) |  | 105 | 105 | 105 | 105 | 105 |
|  | MAA (g) |  | 15 | 15 | 15 | 15 | 15 |
| Cross-linking agent | EDMA (g) |  | 1.5 | 1.5 | 1.5 | 1.5 | 1.5 |
| Blowing agent | Isopentane (g) |  | 75 | 75 | 75 | 75 | 75 |
| Initiator | AIBN (g) |  | 1 | 1 | 1 | 1 | 1 |
| Mixer rotating speed (rpm) |  |  | 5000 | 5000 | 5000 | 5000 | 5000 |
| Polymerization temp. (deg. C.) |  |  | 70 | 70 | 70 | 70 | 70 |
| Average particle size (μm) |  |  | 31 | 28 | 28 | 30 | 33 |
| Retention (wt %) |  |  | 18.4 | 18.1 | 18.5 | 18.5 | 19.2 |
| Efficiency of retention (%) |  |  | 92 | 91 | 93 | 93 | 96 |
| Maximum expanding ratio (times) |  |  | 66 | 62 | 59 | 56 | 74 |
| Repeated compression durability (%) |  |  | 81 | 80 | 80 | 82 | 87 |
| Stability of suspension in polymerization |  |  | good | good | good | good | good |
| Polymerized product sticking on wall inside a reactor |  |  | none | none | none | none | none |
| State of reaction mixture after polymerization |  |  | *1 | *1 | *1 | *1 | *1 |

TABLE 3

|  |  |  | Example |  |  |  | Comparative example A4 |
|---|---|---|---|---|---|---|---|
|  |  |  | A10 | A11 | A12 | A13 |  |
| Aqueous dispersing medium | Water soluble compound | Variant | CMPEI | PMPEI | CMPEI | CBPEI | Sodium nitrite |
|  |  | 1-% aq. soln. (g) | 1 | 10 | 2 | 4 | 15 |
|  | Deionized water (g) |  | 600 | 600 | 600 | 600 | 600 |
|  | NaCl (g) |  | 100 | 100 | — | — | 100 |

TABLE 3-continued

|  |  | Example | | | | Comparative |
| --- | --- | --- | --- | --- | --- | --- |
|  |  | A10 | A11 | A12 | A13 | example A4 |
|  | Colloidal silica (g) | 80 | 80 | 80 | 80 | 80 |
|  | PVP (g) | 0.1 | 0.1 | 0.1 | 0.1 | 0.1 |
|  | pH | 3.0 | 3.0 | 3.0 | 3.0 | 3.0 |
| Monomer | AN (g) | 100 | 100 | 180 | 180 | 100 |
| component | MAN (g) | 20 | 20 | — | — | 20 |
|  | MMA (g) | — | — | 120 | 120 | — |
|  | MAA (g) | 180 | 180 | — | — | 180 |
| Cross-linking agent | EDMA (g) | 0.5 | 0.5 | 1.5 | 1.5 | 0.5 |
| Blowing agent | Isopentane (g) | 75 | 75 | 75 | 75 | 75 |
| Initiator | AIBN (g) | — | — | 1 | 1 | — |
|  | S(BP) (g) | 1 | 1 | — | — | 1 |
| Mixer rotating speed (rpm) |  | 5000 | 5000 | 7000 | 7000 | 5000 |
| Polymerization temp. (deg. C.) |  | 50 | 50 | 70 | 70 | 50 |
| Average particle size (μm) |  | 25 | 28 | 16 | 18 | 26 |
| Retention (wt %) |  | 19.4 | 18.4 | 18.8 | 18.0 | 16.7 |
| Efficiency of retention (%) |  | 97 | 92 | 94 | 90 | 84 |
| Maximum expanding ratio (times) |  | 71 | 53 | 56 | 50 | 41 |
| Repeated-compression durability (%) |  | 86 | 77 | 82 | 79 | 45 |
| Stability of suspension in polymerization |  | good | good | good | good | poor |
| Polymerized product sticking on wall inside a reactor |  | none | none | none | none | sticking |
| State of reaction mixture after polymerization |  | *1 | *1 | *1 | *1 | *2 |

TABLE 4

|  |  |  | Example | | | Comparative example | |
| --- | --- | --- | --- | --- | --- | --- | --- |
|  |  |  | A14 | A15 | A16 | A5 | A6 |
| Aqueous dispersing medium | Water soluble compound | Variant | PMPEI | CMPEI | CEPEI | Potassium dichromate | Sodium nitrite |
|  |  | 1-% aq. soln. (g) | 15 | 2 | 5 | 7.5 | 15 |
|  | Deionized water (g) |  | 600 | 600 | 600 | 600 | 600 |
|  | NaCl (g) |  | — | 20 | 20 | 20 | 20 |
|  | Colloidal silica (g) |  | 80 | 80 | 80 | 80 | 80 |
|  | PVP (g) |  | 0.1 | — | — | — | — |
|  | ADC (g) |  | — | 3 | 3 | 3 | 3 |
|  | pH |  | 3.0 | 3.0 | 3.0 | 3.0 | 3.0 |
| Monomer component | AN (g) |  | 140 | 160 | 160 | 160 | 160 |
|  | MMA (g) |  | 20 | 100 | 100 | 100 | 100 |
|  | MA (g) |  | — | 40 | 40 | 40 | 40 |
|  | VCl$_2$ (g) |  | 140 | — | — | — | — |
| Cross-linking agent | EDMA (g) |  | 1.5 | 1.0 | 1.0 | 1.0 | 1.0 |
| Blowing agent | Isobutane (g) |  | 75 | 80 | 80 | 80 | 80 |
| Initiator | OPP (g) |  | — | 2 | 2 | 2 | 2 |
|  | IPP (g) |  | 1 | — | — | — | — |
| Mixer rotating speed (rpm) |  |  | 8000 | 8000 | 8000 | 8000 | 8000 |
| Polymerization temp. (deg. C.) |  |  | 50 | 55 | 55 | 55 | 55 |
| Average particle size (μm) |  |  | 15 | 13 | 15 | 17 | 17 |
| Retention (wt %) |  |  | 18.8 | 19.3 | 18.8 | 18.8 | 18.2 |
| Efficiency of retention (%) |  |  | 94 | 92 | 90 | 90 | 87 |
| Maximum expanding ratio (times) |  |  | 58 | 77 | 63 | 45 | 18 |
| Repeated-compression durability (%) |  |  | 78 | 82 | 76 | 61 | 43 |
| Stability of suspension in polymerization |  |  | good | good | good | good | poor |
| Polymerized product sticking on wall inside a reactor |  |  | none | none | none | none | sticking |
| State of reaction mixture after polymerization |  |  | *1 | *1 | *1 | *1 | *2 |

TABLE 5

|  |  |  | Example | | Comparative example | |
|---|---|---|---|---|---|---|
|  |  |  | A17 | A18 | A7 | A8 |
| Aqueous dispersing medium | Water soluble compound | Variant | CMPEI | PMPEI | Potassium dichromate | Sodium nitrite |
|  |  | 1-% aq. soln. (g) | 2 | 30 | 7.5 | 20 |
|  | Deionized water (g) |  | 600 | 600 | 600 | 600 |
|  | NaCl (g) |  | 20 | 20 | 20 | 20 |
|  | Colloidal silica (g) |  | 75 | 75 | 75 | 75 |
|  | ADC (g) |  | 10 | 10 | 10 | 10 |
|  | pH |  | 3.0 | 3.0 | 3.0 | 3.0 |
| Monomer component | AN (g) |  | 180 | 180 | 180 | 180 |
|  | MAN (g) |  | 105 | 105 | 105 | 105 |
|  | IBX (g) |  | 15 | 15 | 15 | 15 |
| Cross-linking agent | TMP (g) |  | 0.5 | 0.5 | 0.5 | 0.5 |
|  | 4EG-A (g) |  | 0.5 | 0.5 | 0.5 | 0.5 |
| Blowing agent | Isobutane (g) |  | 35 | 35 | 35 | 35 |
|  | Isopentane (g) |  | 25 | 25 | 25 | 25 |
| Initiator | OPP (g) |  | 3 | 3 | 3 | 3 |
| Mixer rotating speed (rpm) |  |  | 8000 | 8000 | 8000 | 8000 |
| Polymerization temp. (deg. C.) |  |  | 55 | 55 | 55 | 55 |
| Average particle size (µm) |  |  | 14 | 16 | 14 | 14 |
| Retention (wt %) |  |  | 15.2 | 15.0 | 14.9 | 14.0 |
| Efficiency of retention (%) |  |  | 92 | 91 | 90 | 85 |
| Maximum expanding ratio (times) |  |  | 63 | 50 | 45 | 22 |
| Repeated-compression durability (%) |  |  | 88 | 78 | 70 | 58 |
| Stability of suspension in polymerization |  |  | good | good | good | poor |
| Polymerized product sticking on wall inside a reactor |  |  | none | none | none | sticking |
| State of reaction mixture after polymerization |  |  | *1 | *1 | *1 | *2 |

TABLE 6

|  |  |  | Example | | | |
|---|---|---|---|---|---|---|
|  |  |  | B1 | B2 | B3 | B4 |
| Aqueous dispersing medium | Water soluble compound | Variant | CMPEI/2-carboxy pyridine | CMPEI/ Gallic acid | CMPEI/ Vitamin B$_2$ | CMPEI/ AlCl$_3$•6H$_2$O |
|  |  | 1-% aq. soln. (g) | 1/2 | 5/0.3 | 5/0.75 | 1/1 |
|  | Deionized water (g) |  | 600 | 600 | 600 | 600 |
|  | NaCl (g) |  | 20 | 20 | 20 | 20 |
|  | Colloidal silica (g) |  | 80 | 80 | 80 | 80 |
|  | ADC (g) |  | 3 | 3 | 3 | 3 |
|  | pH |  | 3.0 | 3.0 | 3.0 | 3.0 |
| Monomer component | AN (g) |  | 160 | 160 | 160 | 160 |
|  | MMA (g) |  | 100 | 100 | 100 | 100 |
|  | MA (g) |  | 40 | 40 | 40 | 40 |
| Cross-linking agent | EDMA (g) |  | 1.0 | 1.0 | 1.0 | 1.0 |
| Blowing agent | Isobutane (g) |  | 80 | 80 | 80 | 80 |
| Initiator | OPP (g) |  | 2 | 2 | 2 | 2 |
| Mixer rotating speed (rpm) |  |  | 8000 | 8000 | 8000 | 8000 |
| Polymerization temp. (deg. C.) |  |  | 55 | 55 | 55 | 55 |
| Average particle size (µm) |  |  | 18 | 15 | 16 | 19 |
| Retention (wt %) |  |  | 19.0 | 19.4 | 19.2 | 18.9 |
| Efficiency of retention (%) |  |  | 91 | 93 | 92 | 90 |
| Maximum expanding ratio (times) |  |  | 82 | 68 | 64 | 77 |
| Repeated-compression durability (%) |  |  | 90 | 85 | 87 | 87 |
| Stability of suspension in polymerization |  |  | good | good | good | good |
| Polymerized product sticking on wall inside a reactor |  |  | none | none | none | none |
| State of reaction mixture after polymerization |  |  | *1 | *1 | *1 | *1 |

TABLE 7

|  |  |  | Example | | | | | | |
| --- | --- | --- | --- | --- | --- | --- | --- | --- | --- |
|  |  |  | B5 | B6 | B7 | B8 | B9 | B10 | B11 |
| Aqueous dispersing medium | Water soluble compound | Variant | CMPEI/ AlCl$_3$•6H$_2$O | CMPEI/2-carboxy pyridine | CMPEI/ PMPPI | CMPEI/2-carboxy pyridine | CBPEI/2-carboxy pyridine | PEPEI/2-carboxy pyridine | PMPPI/ AlCl$_3$•6H$_2$O |
|  |  | 1-% aq. soln. (g) | 1/1 | 1/2 | 0.5/8 | 1/1 | 20/10 | 20/10 | 10/10 |
|  | Deionized water (g) |  | 600 | 600 | 600 | 600 | 600 | 600 | 600 |
|  | NaCl (g) |  | 20 | 20 | 20 | 100 | 100 | 100 | 100 |
|  | Colloidal silica (g) |  | 75 | 75 | 75 | 80 | 80 | 80 | 80 |
|  | PVP (g) |  | — | — | — | 0.1 | 0.1 | 0.1 | 0.1 |
|  | ADC (g) |  | 10 | 10 | 10 | — | — | — | — |
|  | pH |  | 3.0 | 3.0 | 3.0 | 3.0 | 3.0 | 3.0 | 3.0 |
| Monomer component | AN (g) |  | 180 | 180 | 180 | 180 | 180 | 180 | 180 |
|  | MAN (g) |  | 85 | 105 | 105 | 105 | 105 | 105 | 105 |
|  | IBX (g) |  | 15 | 15 | 15 | 15 | 15 | 15 | 15 |
|  | PMI (g) |  | 20 | — | — | — | — | — | — |
| Cross-linking agent | EDMA (g) |  | — | — | — | 0.5 | 0.5 | 0.5 | 0.5 |
|  | TMP (g) |  | 1.0 | 0.5 | 0.5 | 0.5 | 0.5 | 0.5 | 0.5 |
|  | 4EG-A (g) |  | — | 0.5 | 0.5 | — | — | — | — |
| Blowing agent | Isobutane (g) |  | 95 | 35 | 35 | 75 | 75 | 75 | 75 |
|  | Isopentane (g) |  | — | 25 | 25 | — | — | — | — |
| Initiator | OPP (g) |  | 2 | 3 | 3 | 3 | 3 | 3 | 3 |
| Mixer rotating speed (rpm) |  |  | 6000 | 8000 | 8000 | 6000 | 6000 | 6000 | 6000 |
| Polymerization temp. (deg. C.) |  |  | 55 | 55 | 55 | 55 | 55 | 55 | 55 |
| Average particle size (μm) |  |  | 28 | 14 | 13 | 25 | 30 | 31 | 27 |
| Retention (wt %) |  |  | 21.6 | 15.1 | 15.5 | 19.0 | 18.3 | 18.1 | 18.0 |
| Efficiency of retention (%) |  |  | 90 | 92 | 94 | 96 | 92 | 91 | 91 |
| Maximum expanding ratio (times) |  |  | 79 | 75 | 82 | 80 | 67 | 54 | 55 |
| Repeated-compression durability (%) |  |  | 88 | 87 | 87 | 91 | 82 | 84 | 81 |
| Stability of suspension in polymerization |  |  | good | good | good | good | good | good | good |
| Polymerized product sticking on wall inside a reactor |  |  | none | none | none | none | none | none | none |
| State of reaction mixture after polymerization |  |  | *1 | *1 | *1 | *1 | *1 | *1 | *1 |

Example C1

Three weight percent of the heat-expandable microspheres obtained in Example A10 and 97 weight percent of polypropylene (having a density of 0.9 g/cm³, and a melt flow rate of 14 g/10 min at 230 deg. C.) were placed in a Super Mixer (manufactured by Kawata MFG Co., Ltd.), and mixed about 1 minute at an agitation speed (about 360 rpm) at which the temperature in the mixer did not increase to 60 deg. C. or higher temperature. The resultant mixture was injection-molded with an injection molding machine having a mold locking force about 80 tons and a screw of 32-mm diameter, at an injection pressure about 1000 kg/cm², to be molded into a disc-shaped molded product being 3 mm thick and 98 mm in diameter. The injection-molding was carried out at the temperature levels of 190 deg. C., 210 deg. C., 230 deg. C., and 250 deg. C., and the density and the lightened ratio of the resultant molded products were determined and calculated. The result is shown in Table 8.

Comparative example C1

A molded product was produced in the same manner as in Example except that the heat-expandable microspheres obtained in Example A10 was replaced with the heat-expandable microspheres obtained in Comparative example A4. The result is shown in Table 8.

Example C2

Production Method of Master Batch Containing 30 Weight Percent of Heat-Expandable Microspheres Thirty weight percent of the heat-expandable microspheres obtained in Example A10, 70 weight percent of polyethylene (ENGAGE SM8400, having a density of 0.9 g/cm³ and a melting point of 63.3 deg. C. determined with DSC, produced by Dow Chemical Japan), and 2 weight percent of paraffin oil (150 s) were placed in a Super Mixer (manufactured by Kawata MFG Co., Ltd.), and mixed about 1 minute at an agitation speed (about 360 rpm) at which the temperature in the mixer did not increase to 60 deg. C. or higher temperature.

The resultant mixture was transferred to a Double-screw extruder (GT-110, manufactured by Ikegai), kneaded at a screw rotational speed of 30 rpm and a die temperature of 90 deg. C., and extruded into a diameter of 3 to 3.5 mm. The mixture extruded from the die was immediately hot cut with a pivoting hammer fixed at the outlet of the die. Then the hot cut pellets were immediately transferred into a pellet cooler equipped with a hexagonal rotor, and rotated to be cooled down to 50 deg. C. or lower temperature. Thus the master batch pellets 2-4 mm long and 3-3.5 mm in diameter containing 30 weight percent of the heat-expandable microspheres obtained in Example A10 were prepared.

(Manufacturing Molded Expanded Products)

In Example C2, the molded expanded products were produced in the same manner as in Example C1 except that the mixture of 10 weight percent of the above-mentioned master batch pellets and 90 weight percent of polypropylene was used as the raw material instead of the mixture of 3 weight percent of the heat-expandable microspheres of Example A10 and 97 weight percent of polypropylene. The density and the lightened ratio of the resultant molded expanded products were determined and calculated. The result is shown in Table 8.

Comparative Example C2

In Comparative example C2, the molded products were produced in the same manner as in Example C2 except that the heat-expandable microspheres obtained in Example A10 was replaced with the heat-expandable microspheres obtained in Comparative example A4. The density and the lightened ratio of the resultant molded products were determined and calculated. The result is shown in Table 8.

TABLE 8

|  | Extrusion temperature (deg. C.) | Density (g/cm³) | Lightened ratio (%) |
|---|---|---|---|
| Example C1 | 190 | 0.69 | 23 |
|  | 210 | 0.66 | 27 |
|  | 230 | 0.63 | 30 |
|  | 250 | 0.60 | 33 |
| Comparative example C1 | 190 | 0.83 | 8 |
|  | 210 | 0.84 | 7 |
|  | 230 | 0.83 | 8 |
|  | 250 | 0.85 | 6 |
| Example C2 | 190 | 0.66 | 27 |
|  | 210 | 0.62 | 31 |
|  | 230 | 0.62 | 31 |
|  | 250 | 0.60 | 33 |
| Comparative example C2 | 190 | 0.88 | 2 |
|  | 210 | 0.89 | 1 |
|  | 230 | 0.87 | 3 |
|  | 250 | 0.88 | 2 |

The result in Table 8 clearly shows that the heat-expandable microspheres of the present invention exhibit excellent lightening performance for resins, and high durability against mixing stress in making master batches.

Example C3

Production Method of Hollow Particulates

An aqueous dispersion (slurry) containing 5 weight percent of the heat-expandable microspheres produced in Example A17 was prepared. The microspheres in the aqueous dispersion was expanded in the wet heating-expanding method described in JP A 62-201231 to produce hollow particulates. The detail is described below.

The slurry was fed through a slurry introducing pipe to an expanding pipe (specified as SUS304TP in JIS, 16 mm in diameter with 120 ml capacity) at a flow rate of 5 liter/min. Simultaneously steam (at 147 deg. C., a pressure of 0.3 MPa) was fed through a steam introducing pipe to be mixed with the slurry so as to heat and expand the microspheres under wet condition. The temperature of the mixture of the slurry and the steam was controlled at 120 deg. C., and the resultant pressure of the mixture was 0.18 MPa.

The resultant slurry containing hollow particulates was flowed out through the tip of the expanding pipe and mixed with cooling water (at 15 deg. C.) to be cooled down to 50 to 60 deg. C. The cooled slurry was dehydrated with a centrifugal dehydrator to obtain composition (containing 15 weight percent of water) containing wet hollow particulates.

Raw materials for ceramic, i.e., 283 g of cordierite, 14.2 g of methyl cellulose, and 42.5 g of the composition obtained in the process mentioned above, were kneaded into ceramic composition which could be extrusion-molded. Then the ceramic composition was formed with extrusion-molding, and shaped into unbaked ceramic-molded articles (clay articles).

Then the density of the clay constituting the ceramic-molded articles (clay articles) was determined in the following procedure to evaluate the durability of the hollow particulates against rupture caused by the stress generated in mixing the hollow particulates and ceramic materials and in extrusion-molding the resultant composition comprising the hollow particulates and ceramic materials. The result is shown in Table 9.

(Measurement of Clay Density)

A ceramic-molded article (clay article) was cut into a prescribed volume, and weighed. Then the determined weight was divided by the volume to calculate the density of the clay. The result was classified according to the following criteria to evaluate the durability of the hollow particulates in the clay against rupture caused by the stress generated in mixing and extrusion molding. Lower clay density indicates better durability of hollow particulates against rupture caused by the stress generated in mixing and extrusion molding.

(Criteria)

◉: clay density below 1.4 g/cm³

○: clay density ranging from 1.4 g/cm³ to 1.6 g/cm³ (not including 1.6 g/cm³)

Δ: clay density ranging from 1.6 g/cm³ to 1.7 g/cm³ (not including 1.7 g/cm³)

X: clay density of 1.7 g/cm³ or more

Example C4 and Comparative Examples C3 and C4

In Example C4 and Comparative examples C3 and C4, the evaluation was carried out in the same manner as in Example C3 except that the heat-expandable microspheres used in Example C3 was replaced with each of the raw material heat-expandable microspheres shown in Table 9.

TABLE 9

|  | Raw material heat-expandable microspheres | Density of clay (g/cm³) | Evaluation |
|---|---|---|---|
| Example C3 | Example A17 | 1.3 | ◉ |
| Example C4 | Example A18 | 1.5 | ○ |
| Comparative example C3 | Comparative example A7 | 2.0 | X |
| Comparative example C4 | Comparative example A8 | 2.1 | X |

The result in Table 9 clearly shows that the hollow particulates produced from the heat-expandable microspheres of the present invention exhibit excellent performance when they are mixed with inorganic materials, such as ceramic material, and are processed.

Example C5

A greater scale reaction was carried out with the same ratios for mixing the materials and the same reaction condition as those in Example A1, and 20 kg of dry heat-expandable microspheres were produced. The heat-expandable microspheres had properties equivalent to those of the heat-expandable microspheres produced in Example A1.

Two kilograms of the heat-expandable microspheres produced in the above-mentioned method and 8 kg of heavy calcium carbonate (WHITON SB Red, with an average particle size of 1.8 micrometer, produced by Shiraishi Calcium Kaisha Ltd.) were fed into a SV Mixer (30 liter capacity, manufactured by KOBELCO Eco-Solutions Co., Ltd.), and mixed for 10 minutes. Then the resultant mixture was transferred into a Lödige mixer (manufactured by Matsubo Corporation), heated with a jacket controlled at 190 deg. C. for 10 minutes to raise the temperature of the mixture to 150 deg. C., and then cooled down to obtain a composition containing hollow particulates having an average particle size of 110 micrometer and a true specific gravity of 0.15 g/cc.

The resultant composition was tested to evaluate the repeated-compression durability of the hollow particulates.

The testing procedure was the same as in the determination of [Repeated-compression durability] already mentioned above, except that 2.00 mg of the hollow particulates were replaced with 10.0 mg of the above-mentioned composition. The result is shown in Table 10.

Comparative Example C5

In Comparative example C5, the determination was performed in the same manner as in Example C5 except that heat-expandable microspheres were produced with the ratios for mixing materials in Comparative example A3 instead of the ratios for mixing materials in Example A1. The result is shown in Table 10.

TABLE 10

|  | Raw material heat-expandable microspheres | True specific gravity (g/cm$^3$) | Repeated-compression durability |
| --- | --- | --- | --- |
| Example C5 | Example A1 | 0.15 | 85% |
| Comparative example C5 | Comparative example A3 | 0.16 | 57% |

The result in Table 10 clearly shows that the composition containing the heat-expandable microspheres of the present invention exhibits excellent performance in the testing of repeated-compression durability.

Example C6

Forming Unexpanded Coating Film

A paint was prepared by adding 10 weight percent of the heat-expandable microspheres produced in Example A15 to a liquid containing 55 weight percent concentration of ethylene-vinyl acetate copolymer (EVA, consisting of ethylene and vinyl acetate in the ratio of 30:70 weight percent) so as to blend 9 parts by weight of EVA and 1 part by weight of the heat-expandable microspheres. The paint was spread on double-faced art paper with a coater having 200-micrometer gap. Then the double-faced art paper coated with the paint was dried to form 200-micrometer thick unexpanded coating film containing 10 weight percent of the heat-expandable microspheres produced in Example A15 on the surface of the double-faced art paper.

(Forming Expanded Coating Film)

The double-faced art paper, on which the unexpanded coating film mentioned above was formed, was heated in a Geer oven at a prescribed temperature for a prescribed period to obtain double-faced art paper on which expanded coating film was formed.

(Determination Method for Expanding Ratio)

The thickness of the double-faced art paper on which unexpanded coating film was formed (A) and the thickness of the double-faced art paper on which expanded coating film was formed (B) were determined, and the ratio between the thicknesses of unexpanded and expanded films (B/A) was calculated to evaluate the design effect. The result is shown in Table 11. Higher ratio of increased thickness indicates better design effect.

Example C7 and Comparative Example C6

In Example C7 and Comparative example C6, the evaluation was carried out in the same manner as in Example C6, except that the raw material heat-expandable microspheres was replaced with each of the microspheres shown in Table 11.

TABLE 11

|  | Raw material heat-expandable microspheres | Heating temperature (deg. C.) (2 min) | Ratio of increased thickness |
| --- | --- | --- | --- |
| Example C6 | Example A15 | 110 | 6.7 |
|  |  | 130 | 8.8 |
|  |  | 150 | 6.5 |
| Example C7 | Example B1 | 110 | 7.2 |
|  |  | 130 | 8.8 |
|  |  | 150 | 7.0 |
| Comparative example C6 | Comparative example A6 | 110 | 1.3 |
|  |  | 130 | 2.6 |
|  |  | 150 | 1.1 |

The result in Table 11 clearly shows that the expanded coating films formed of the heat-expandable microspheres of the present invention are thick enough and exhibit excellent design effect.

Example C8

Forming Unexpanded PVC Coating Film

A compound was prepared by mixing 25 parts by weight of polyvinyl chloride (PVC, supplied by Shin Dai-Ichi Enbi Co., Ltd.), 50 parts by weight of DINP (supplied by New Japan Chemical Co., Ltd.), 25 parts by weight of calcium carbonate (supplied by Bihoku Funka Kogyo Co., Ltd.) and 1 parts by weight of the heat-expandable microspheres produced in Example A15. The resultant compound was spread into 1.5-mm thick film on a 0.8-mm thick Teflon™ sheet (EGF-500-10) placed on an iron plate for electrodeposition coating. Then the film was heated to be gelled in a Geer oven at 100 deg. C. for 10 minutes, and the resultant film was peeled off from the Teflon™ sheet. Thus unexpanded PVC coating film was formed.

(Forming Expanded PVC Coating Film)

The unexpanded PVC coating film mentioned above was heated in a Geer oven at a prescribed temperature for a prescribed period to obtain expanded PVC coating film.

(Determination Method for Expanding Ratio)

The specific gravity of the unexpanded PVC coating film (A) and that of expanded PVC coating film (B) was determined, and the ratio of decreased specific gravity after expansion (=(A−B)×100/A) was calculated to evaluate the lightening performance. The result is shown in Table 12. Higher ratio of decreased specific gravity represents better lightening performance, cushioning performance, elasticity, and impact resistance.

Example C9 and Comparative Example C7

In Example C9 and Comparative example C7, the evaluation was carried out in the same manner as in Example C8, except that the raw material heat-expandable microspheres were replaced with each of the microspheres shown in Table 12.

TABLE 12

| Raw material heat-expandable microspheres | | Heating temperature (deg. C.) (30 min) | Ratio of decreased specific gravity (%) |
|---|---|---|---|
| Example C8 | Example A15 | 110 | 25 |
| | | 130 | 41 |
| | | 150 | 23 |
| Example C9 | Example B1 | 110 | 28 |
| | | 130 | 38 |
| | | 150 | 30 |
| Comparative example C7 | Comparative example A6 | 110 | 3 |
| | | 130 | 15 |
| | | 150 | 2 |

The result in Table 12 clearly shows that the expanded PVC coating films formed of the heat-expandable microspheres of the present invention have excellent lightening performance, cushioning performance, elasticity, and impact resistance.

Example C10

Forming Unexpanded Acrylate Coating Film

A compound was prepared by mixing 50 parts by weight of methacrylate resin powder (supplied by Zeon Corporation), 40 parts by weight of acetyltributyl citrate, 10 parts by weight of calcium carbonate (supplied by Bihoku Funka Kogyo Co., Ltd.), and 1 parts by weight of the heat-expandable microspheres produced in Example A15. The resultant compound was spread into 1.5-mm thick film on a 0.8-mm thick Teflon™ sheet (EGF-500-10) placed on an iron plate for electrodeposition coating. Then the film was heated to be gelled in a Geer oven at 100 deg. C. for 10 minutes, and the resultant film was peeled off from the Teflon™ sheet. Thus unexpanded acrylate coating film was formed.

(Forming Expanded Acrylate Coating Film)

The unexpanded acrylate coating film mentioned above was heated in a Geer oven at a prescribed temperature for a prescribed period to obtain expanded acrylate coating film.

(Determination of Expanding Ratio)

The specific gravity of the unexpanded acrylate coating film (A) and that of expanded acrylate coating film (B) were determined, and calculated into the ratio of decreased specific gravity after expansion (=(A−B)×100/A) to evaluate lightening performance. The result is shown in Table 13. Higher ratio of decreased specific gravity represents better lightening performance, cushioning performance, elasticity, and impact resistance.

Example C11 and Comparative Example C8

In Example C11 and Comparative example C8, the evaluation was carried out in the same manner as in Example C10, except that the raw material heat-expandable microspheres was replaced with each of the microspheres shown in Table 13.

TABLE 13

| Raw material heat-expandable microspheres | | Heating temperature (deg. C.) (30 min) | Ratio of decreased specific gravity (%) |
|---|---|---|---|
| Example C10 | Example A15 | 110 | 36 |
| | | 130 | 52 |
| | | 150 | 41 |
| Example C11 | Example B1 | 110 | 40 |
| | | 130 | 55 |
| | | 150 | 38 |
| Comparative example C8 | Comparative example A5 | 110 | 3 |
| | | 130 | 13 |
| | | 150 | 3 |

The result in Table 13 clearly shows that the expanded acrylate coating films formed of the heat-expandable microspheres of the present invention have excellent lightening performance, cushioning performance, elasticity, and impact resistance.

Example D1

Heat-expandable microspheres were produced by polymerizing in the same manner as in Example A1 except that 1-% aqueous solution of aluminum sulfate tetradeca- to octadeca-hydrate ($Al_2(SO_4)_3 \cdot 14\text{-}18H_2O$) was used instead of 1-% aqueous solution of a polyethyleneimine.

The suspension in the polymerization reaction was stable enough, and the reaction mixture after the polymerization was in good state without abnormal properties. When the reaction mixture was drawn out after the polymerization, no polymerized products sticking on the inside wall of the reactor were observed. The properties of the resultant heat-expandable microspheres are described in Table 14.

Examples D2 to D14

In Examples D2 to D14, heat-expandable microspheres were produced by polymerizing in the same manner as in Example D1 except that each of the reacting conditions was changed as shown in Tables 14 to 16.

The properties of the resultant heat-expandable microspheres are described in Tables 14 to 16 in the same manner as in Example D1.

TABLE 14

| | | | Example | | | | |
|---|---|---|---|---|---|---|---|
| | | | D1 | D2 | D3 | D4 | D5 |
| Aqueous dispersing medium | Water soluble compound | Variant | $Al_2(SO_4)_3 \cdot 14\text{-}18H_2O$ | $AlK(SO_4)_2 \cdot 12H_2O$ | $AlNA(SO_4)_2 \cdot 12H_2O$ | $Al(NH_4)(SO_4)2 \cdot 12H_2O$ | $Al(NO_3)_3 \cdot 9H_2O$ |
| | | 1-% aq. soln. (g) | 1 | 1 | 1 | 1 | 1 |
| | Deionized water (g) | | 600 | 600 | 600 | 600 | 600 |
| | NaCl (g) | | 100 | 100 | 100 | 100 | 100 |
| | Colloidal silica (g) | | 80 | 80 | 80 | 80 | 80 |

TABLE 14-continued

|  |  | D1 | D2 | D3 | D4 | D5 |
|---|---|---|---|---|---|---|
|  | PVP (g) | 0.1 | 0.1 | 0.1 | 0.1 | 0.1 |
|  | pH | 3.0 | 3.0 | 3.0 | 3.0 | 3.0 |
| Monomer component | AN (g) | 180 | 180 | 180 | 180 | 180 |
|  | MAN (g) | 105 | 105 | 105 | 105 | 105 |
|  | MMA (g) | 15 | 15 | 15 | 15 | 15 |
| Cross-linking agent | EDMA (g) | 1.5 | 1.5 | 1.5 | 1.5 | 1.5 |
| Blowing agent | Isopentane (g) | 75 | 75 | 75 | 75 | 75 |
| Initiator | AIBN (g) | 1 | 1 | 1 | 1 | 1 |
| Mixer rotating speed (rpm) |  | 5000 | 5000 | 5000 | 5000 | 5000 |
| Polymerization temp. (deg. C.) |  | 70 | 70 | 70 | 70 | 70 |
| Average particle size (μm) |  | 34 | 32 | 33 | 34 | 33 |
| Retention (wt %) |  | 19.2 | 19.2 | 19.1 | 19.2 | 18.9 |
| Efficiency of retention (%) |  | 96 | 96 | 96 | 96 | 95 |
| Maximum expanding ratio (times) |  | 71 | 69 | 70 | 70 | 68 |
| Repeated-compression durability (%) |  | 85 | 84 | 84 | 84 | 83 |
| Stability of suspension in polymerization |  | good | good | good | good | good |
| Polymerized product sticking on wall inside a reactor |  | none | none | none | none | none |
| State of reaction mixture after polymerization |  | *1 | *1 | *1 | *1 | *1 |

TABLE 15

|  |  |  | D6 | D7 | D8 | D9 | D10 |
|---|---|---|---|---|---|---|---|
| Aqueous dispersing medium | Water soluble compound | Variant | $Al_2(SO_4)_3 \cdot 14\text{-}18H_2O$ | $AlK(SO_4)_2 \cdot 12H_2O$ | $Al(NO_3)_3 \cdot 9H_2O$ | $Al_2(SO_4)_3 \cdot 14\text{-}18H_2O$ | $AlK(SO_4)_2 \cdot 12H_2O$ |
|  |  | 1-% aq. soln. (g) | 1 | 1 | 1 | 1 | 1 |
|  | Deionized water (g) |  | 600 | 600 | 600 | 600 | 600 |
|  | NaCl (g) |  | 100 | 100 | 100 | 100 | 100 |
|  | Colloidal silica (g) |  | 80 | 80 | 80 | 80 | 80 |
|  | PVP (g) |  | 0.1 | 0.1 | 0.1 | 0.1 | 0.1 |
|  | pH |  | 3.0 | 3.0 | 3.0 | 3.0 | 3.0 |
| Monomer component | AN (g) |  | 180 | 180 | 180 | 180 | 180 |
|  | MAN (g) |  | 105 | 105 | 105 | 105 | 105 |
|  | IBX (g) |  | 15 | 15 | 15 | — | — |
|  | MAA (g) |  | — | — | — | 15 | 15 |
| Cross-linking agent | EDMA (g) |  | 1.5 | 1.5 | 1.5 | 1.5 | 1.5 |
| Blowing agent | Isopentane (g) |  | 75 | 75 | 75 | 75 | 75 |
| Initiator | AIBN (g) |  | 1 | 1 | 1 | 1 | 1 |
| Mixer rotating speed (rpm) |  |  | 5000 | 5000 | 5000 | 5000 | 5000 |
| Polymerization temp. (deg. C.) |  |  | 70 | 70 | 70 | 70 | 70 |
| Average particle size (μm) |  |  | 34 | 32 | 33 | 34 | 33 |
| Retention (wt %) |  |  | 19.3 | 19.2 | 19.0 | 19.2 | 18.9 |
| Efficiency of retention (%) |  |  | 97 | 96 | 95 | 96 | 95 |
| Maximum expanding ratio (times) |  |  | 71 | 71 | 69 | 70 | 68 |
| Repeated-compression durability (%) |  |  | 85 | 84 | 84 | 84 | 83 |
| Stability of suspension in polymerization |  |  | good | good | good | good | good |
| Polymerized product sticking on wall inside a reactor |  |  | none | none | none | none | none |
| State of reaction mixture after polymerization |  |  | *1 | *1 | *1 | *1 | *1 |

TABLE 16

|  |  |  | D11 | D12 | D13 | D14 |
|---|---|---|---|---|---|---|
| Aqueous dispersing medium | Water soluble compound | Variant | $Al_2(SO_4)_3 \cdot 14\text{-}18H_2O$ | $AlK(SO_4)_2 \cdot 12H_2O$ | $Al_2(SO_4)_3 \cdot 14\text{-}18H_2O$ | $Al_2(SO_4)_3 \cdot 14\text{-}18H_2O$ |
|  |  | 1-% aq. soln. (g) | 1 | 1 | 1 | 1 |

TABLE 16-continued

|  |  | Example | | | |
|---|---|---|---|---|---|
|  |  | D11 | D12 | D13 | D14 |
|  | Deionized water (g) | 600 | 600 | 600 | 600 |
|  | NaCl (g) | 100 | 100 | 100 | — |
|  | Colloidal silica (g) | 80 | 80 | 80 | 80 |
|  | PVP (g) | 0.1 | 0.1 | 0.1 | 0.1 |
|  | pH | 3.0 | 3.0 | 3.0 | 3.0 |
| Monomer component | AN (g) | 100 | 100 | 180 | 140 |
|  | MAN (g) | 20 | 20 | 85 | — |
|  | MMA (g) | — | — | — | 20 |
|  | $VCl_2$ (g) | — | — | — | 140 |
|  | IBX (g) | — | — | 15 | — |
|  | MAA (g) | 180 | 180 | — | — |
|  | PMI (g) | — | — | 20 | — |
| Cross-linking agent | EDMA (g) | 1.5 | 1.5 | — | 1.5 |
|  | TMP (g) | — | — | 1.0 | — |
| Blowing agent | Isobutane (g) | — | — | — | 75 |
|  | Isopentane (g) | 75 | 75 | 75 | — |
| Initiator | S(BP) (g) | 1 | 1 | — | — |
|  | OPP (g) | — | — | 1 | — |
|  | IPP (g) | — | — | — | 1 |
| Mixer rotating speed (rpm) |  | 5000 | 5000 | 6000 | 8000 |
| Polymerization temp. (deg. C.) |  | 50 | 50 | 55 | 50 |
| Average particle size (μm) |  | 33 | 31 | 25 | 15 |
| Retention (wt %) |  | 19.1 | 18.9 | 19.1 | 18.7 |
| Efficiency of retention (%) |  | 96 | 95 | 96 | 94 |
| Maximum expanding ratio (times) |  | 69 | 69 | 80 | 57 |
| Repeated-compression durability (%) |  | 84 | 83 | 85 | 76 |
| Stability of suspension in polymerization |  | good | good | good | good |
| Polymerized product sticking on wall inside a reactor |  | none | none | none | none |
| State of reaction mixture after polymerization |  | *1 | *1 | *1 | *1 |

In the tables described above, the symbols and abbreviations are used with the meaning as follows.

*1: Reaction mixture after polymerization was in good state without abnormal property.

*2: Most of reaction mixture after polymerization coagulated and/or solidified.

CMPEI: a polyethyleneimine (having a substituted alkyl group (A) of —$CH_2COONa$ with a substitution ratio of 80%, and a weight average molecular weight of 50,000), sometimes referred to as carboxymethylated polyethyleneimine sodium salt CEPEI: a polyethyleneimine (having a substituted alkyl group (A) of —$CH_2CH_2COONa$ with a substitution ratio of 70%, and a weight average molecular weight of 10,000), sometimes referred to as carboxyethylated polyethyleneimine sodium salt CBPEI: a polyethyleneimine (having a substituted alkyl group (A) of —$CH_2CH_2CH_2CH_2COONa$ with a substitution ratio of 65%, and a weight average molecular weight of 10,000), sometimes referred to as carboxybutylated polyethyleneimine sodium salt CMPPI: a polypropyleneimine (having a substituted alkyl group (A) of —$CH_2COONa$ with a substitution ratio of 70%, and a weight average molecular weight of 10,000), sometimes referred to as carboxymethylated polypropyleneimine sodium salt PMPEI: a polyethyleneimine (having a substituted alkyl group (A) of —$CH_2PO_3Na_2$ with a substitution ratio of 75%, and a weight average molecular weight of 90,000), sometimes referred to as phosphonomethylated polyethyleneimine disodium salt PEPEI: a polyethyleneimine (having a substituted alkyl group (A) of —$CH_2CH_2PO_3Na_2$ with a substitution ratio of 60%, and a weight average molecular weight of 90,000), sometimes referred to as phosphonoethylated polyethyleneimine disodium salt PMPPI: a polypropyleneimine (having a substituted alkyl group (A) of —$CH_2PO_3Na_2$ with a substitution ratio of 50%, and a weight average molecular weight of 10,000), sometimes referred to as phosphonomethyl polypropyleneimine disodium salt Potassium dichromate: potassium dichromate (supplied by Wako Pure Chemical Industries, Ltd.)

2-carboxy pyridine: supplied by Wako Pure Chemical Industries, Ltd., with the trade name of 2-pyridinecarboxylic acid Gallic acid: gallic acid hydrate (supplied by Wako Pure Chemical Industries, Ltd.)

Vitamin $B_2$: riboflavin (supplied by Wako Pure Chemical Industries, Ltd., with the trade name of Vitamin $B_2$)

$AlCl_3.6H_2O$: aluminum chloride hexahydrate (supplied by Wako Pure Chemical Industries, Ltd.)

EDTA: ethylenediaminetetraacetic acid tetrasodium salt tetrahydrate (supplied by Chelest, with the trade name of CHELEST 3D)

$Al_2(SO_4)_3.14-18H_2O$: aluminum sulfate tetradeca- to octadeca-hydrate (supplied by Wako Pure Chemical Industries, Ltd.)

$AlK(SO_4)_2.12H_2O$: aluminum potassium sulfate dodecahydrate (supplied by Wako Pure Chemical Industries, Ltd.)

$AlNa(SO_4)_2.12H_2O$: aluminum sodium sulfate dodecahydrate (supplied by Wako Pure Chemical Industries, Ltd.)

$Al(NH_4)(SO_4)_2.12H_2O$: aluminum ammonium sulfate dodecahydrate (supplied by Wako Pure Chemical Industries, Ltd.)

$Al(NO_3)_3.9H_2O$: aluminum nitrate nonahydrate (supplied by Wako Pure Chemical Industries, Ltd.)

PVP: polyvinyl pyrrolidone (supplied by BASF Japan Ltd., with the trade name of Luvitec K17 powder)

ADC: adipic acid-diethanolamine condensate, 50-% aqueous solution
AN: acrylonitrile
MAN: methacrylonitrile
MMA: methyl methacrylate
MA: methyl acrylate
$VCl_2$: vinylidene chloride
IBX: isobornyl methacrylate
MAA: methacrylic acid
PMI: N-phenyl maleimide (supplied by Nippon Shokubai Co., Ltd.)
EDMA: diethyleneglycol dimethacrylate (supplied by Mitsubishi Rayon Co., Ltd.)
TMP: trimethylolpropane trimethacrylate (supplied by Kyoeisha Chemical Co., Ltd.)
4EG-A: PEG(200) dimethacrylate (supplied by Kyoeisha Chemical Co., Ltd.)
AIBN: 2,2'-azo isobutyronitrile (supplied by Japan Hydrazine Company, Inc.)
S(BP): di-sec-butyl peroxydicarbonate (Lupasol 225 or S(BP), 50% concentration, supplied by Arkema Yoshitomi, Ltd.)
OPP: di(2-ethylhexyl) peroxydicarbonate (PEROYL OPP, 70% concentration, supplied by NOF Corporation)
IPP: diisopropyl peroxydicarbonate (PEROYL IPP-50, 50% concentration, supplied by NOF Corporation)

INDUSTRIAL APPLICABILITY

The production method for the heat-expandable microspheres of the present invention efficiently produces heat-expandable microspheres which have high expanding ratio and are useful for the application where improved design effect, porosity, lightening effect, sound absorbency, thermal insulation performance, thermal conductivity, and shock absorption performance are required.

What is claimed is:

1. A method of producing heat-expandable microspheres, each comprising a shell of thermoplastic resin and a blowing agent encapsulated therein having a boiling point not higher than the softening point of the thermoplastic resin, the method comprising the step of:
 polymerizing a polymerizable component in an aqueous dispersing medium in the presence of at least one water-soluble compound;
 wherein the polymerizable component and the blowing agent mentioned above are dispersed in the aqueous dispersing medium, and the water-soluble compound is selected from the group consisting of oxygen-containing aluminum salts and/or their hydrates, and polyalkyleneimines having a molecular weight not lower than 1000 and at least one bond of a nitrogen atom and an alkyl group which is substituted with a hydrophilic functional group selected from the group consisting of carboxylic acid (salt) groups and phosphonic acid (salt) groups,
 wherein the aluminum salt further contains an atom of a typical element selected from the group consisting of nitrogen and sulfur.

2. The method of producing heat-expandable microspheres according to claim 1, wherein the polyalkyleneimines include at least one selected from the group consisting of polyethyleneimines, polypropyleneimines, and polybutyleneimines, and the substituted alkyl group is at least one selected from the group consisting of methyl group, ethyl group, and propyl group, each alkyl group being substituted with the hydrophilic functional group.

3. The method of producing heat-expandable microspheres according to claim 1, wherein the nitrogen atom forming the bond constitutes at least 10% of the whole of the nitrogen contained in the polyalkyleneimine.

4. The method of producing heat-expandable microspheres according to claim 1, wherein the water-soluble compound further includes at least one compound selected from the group consisting of metal halides and/or their hydrates, water-soluble polyphenols, water-soluble vitamin Bs, and water-soluble 1,1-substituted compounds having a bond at which the same carbon atom is bonded with a hetero atom and a hydrophilic functional group, the hydrophilic functional group being selected from the group consisting of hydroxyl group, carboxylic acid (salt) groups, and phosphonic acid (salt) groups.

5. The method of producing heat-expandable microspheres according to claim 1, wherein the amount of the water-soluble compound ranges from 0.0001 to 1.0 part by weight to 100 parts by weight of the polymerizable component.

6. The method of producing heat-expandable microspheres according to claim 1, wherein the polymerizable component contain at least one monomer selected from the group consisting of nitrile monomers, (meth)acrylate monomers, carboxyl-group-containing monomers, styrene monomers, vinyl acetate, acrylamide monomers, maleimide monomers, and vinylidene chloride.

7. The method of producing heat-expandable microspheres according to claim 1, wherein the polymerization is carried out in the presence of peroxydicarbonate as a polymerization initiator.

8. The method of producing heat-expandable microspheres according to claim 1, wherein the method further comprises a step of adhering a fine particulate filler on the outer surface of the shell.

9. Heat-expandable microspheres produced in a method according to claim 1, wherein the heat-expandable microspheres have a maximum expanding ratio of at least 50 times and are thermally expanded into hollow particulates having a repeated-compression resistance of at least 75 percent.

10. Hollow particulates produced by thermally expanding the heat-expandable microspheres according to claim 9.

11. A composition comprising a base component and heat-expandable microspheres according to claim 9.

12. A formed product produced by forming the composition according to claim 11.

13. The method of producing heat-expandable microspheres according to claim 2, wherein the nitrogen atom forming the bond constitutes at least 10% of the whole of the nitrogen contained in the polyalkyleneimine.

14. The method of producing heat-expandable microspheres according to claim 4, wherein the amount of the water-soluble compound ranges from 0.0001 to 1.0 part by weight to 100 parts by weight of the polymerizable component.

15. The method of producing heat-expandable microspheres according to claim 4, wherein the polymerizable component contain at least one monomer selected from the group consisting of nitrile monomers, (meth)acrylate monomers, carboxyl-group-containing monomers, styrene monomers, vinyl acetate, acrylamide monomers, maleimide monomers, and vinylidene chloride.

16. Heat-expandable microspheres produced in a method according to claim 8, wherein the heat-expandable microspheres have a maximum expanding ratio of at least 50 times and are thermally expanded into hollow particulates having a repeated-compression resistance of at least 75 percent.

17. Hollow particulates produced by thermally expanding the heat-expandable microspheres according to claim 16.

18. A composition comprising a base component and hollow particulates according to claim 17.

19. A formed product produced by forming the composition according to claim 18.

20. The method of producing heat-expandable microspheres according to claim 1, wherein at least 1 g of the water-soluble compound is soluble in 100 g of water.

21. The method of producing heat-expandable microspheres according to claim 1, wherein the substituted alkyl group is represented by the chemical formula (I) shown below $$—C_pH_{2p}—X \qquad (1)$$

where p is an integer ranging from 1 to 10, $C_pH_{2p}$ may either be linear or branched chain, and X is a carboxylic acid (salt) group or phosphonic acid (salt) group.

22. The method of producing heat-expandable microspheres according to claim 1, wherein the carboxylic acid (salt) group is a carboxylate group formed by substituting a proton of a carboxyl group with a metal atom selected from the group consisting of alkaline metals and alkaline earth metals.

* * * * *